US012793681B2

(12) United States Patent
Yamaguchi

(10) Patent No.: US 12,793,681 B2
(45) Date of Patent: Nov. 10, 2026

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: Kabushiki Kaisha Kawai Gakki Seisakusho, Hamamatsu (JP)

(*) Notice: Subject to any disclaimer, the term of this patent is extended or adjusted under 35 U.S.C. 154(b) by 1084 days.

(21) Appl. No.: 17/951,313

(22) Filed: Sep. 23, 2022

(65) Prior Publication Data

US 2023/0101297 A1 Mar. 30, 2023

(30) Foreign Application Priority Data

Sep. 30, 2021 (JP) ................................ 2021-161119

(51) Int. Cl.
*G10H 1/34* (2006.01)

(52) U.S. Cl.
CPC ....... *G10H 1/346* (2013.01); *G10H 2220/221* (2013.01); *G10H 2220/265* (2013.01)

(58) Field of Classification Search
CPC ............ G10H 1/346; G10H 2220/221; G10H 2220/265
USPC ........................................................... 84/644
See application file for complete search history.

(56) References Cited

U.S. PATENT DOCUMENTS

2010/0282049 A1* 11/2010 Yoshida ................. G10H 1/346 84/744
2011/0017049 A1* 1/2011 Shimoda .................. G10C 3/12 84/744
2013/0074683 A1* 3/2013 Ishida .................... G10H 1/346 84/743
2013/0081532 A1* 4/2013 Suzuki ................... G10H 1/346 84/720
2019/0019484 A1* 1/2019 Taniguchi ................ G10C 3/16

FOREIGN PATENT DOCUMENTS

JP 2011-27854 A 2/2011

* cited by examiner

*Primary Examiner* — Jeffrey Donels
*Assistant Examiner* — Philip G Scoles
(74) *Attorney, Agent, or Firm* — Womble Bond Dickinson (US) LLP

(57) ABSTRACT

A keyboard device for a keyboard instrument includes a keyboard chassis having a plurality of partition walls, a plurality of keys, and a plurality of hammers pivotally moved along with key depression. Let-off members are removably mounted on one of each adjacent two of the partition walls and one of the hammers disposed between the adjacent two partition walls. Engagement portions are provided on the other of each adjacent two of the partition walls and the one of the hammers disposed between the adjacent two partition walls. The engagement portions are temporarily engaged with the let-off members during pivotal movement of the hammer along with depression of a key, to thereby add let-off feeling to touch feeling of the depressed key.

12 Claims, 17 Drawing Sheets

KEYBOARD DEVICE FOR KEYBOARD INSTRUMENT

CROSS-REFERENCE TO RELATED APPLICATIONS

This application claims priority to Japanese Patent Application Number 2021-161119, filed on Sep. 30, 2021, the entire content of which is incorporated herein by reference.

BACKGROUND OF THE INVENTION

Field of the Invention

The present invention relates to a keyboard device which is applied to a keyboard instrument, such as an electronic piano, and has a let-off function of imparting let-off feeling analogous to let-off of an acoustic piano.

Description of the Related Art

Conventionally, as this type of a keyboard device, there has been known, for example, one disclosed in Japanese Laid-Open Patent Publication (Kokai) No. 2011-27854 already filed by the present applicant. This keyboard device is comprised of a keyboard chassis, keys which extend in a front-rear direction and have rear ends pivotally supported by the keyboard chassis, and hammers provided below the keys for each pivotally moving in a manner interlocked with a key associated therewith. The hammers are each pivotally supported on a hammer support shaft provided in the keyboard chassis. When a key is depressed, a predetermined portion of a hammer associated therewith forward of the hammer support shaft is depressed by the key, whereby a portion the hammer rearward of the hammer support shaft is moved upward. Further, at a predetermined portion of the hammer rearward of the hammer support shaft, there is provided an engagement protrusion protruding upward, whereas at a flat plate of the keyboard chassis located between the key and the hammer, there is provided a let-off member made of an elastic material and protruding obliquely downward and forward.

When the key is depressed, the hammer is pivotally moved according to depression of the key, causing the engagement protrusion to move upward, the engagement protrusion of the hammer is temporarily engaged with the let-off member, whereby temporary resistance force acts on the hammer being pivotally moved. With this, let-off feeling analogous to let-off of an acoustic piano is imparted to touch feeling of the key associated with the hammer.

As described above, in the keyboard device, to obtain the let-off feeling, the hammer is provided with the engagement protrusion, whereas, since the let-off member is provided between the hammer and the key, a relatively large space is required between the hammer and the key, which increases the height dimension of the keyboard device. Further, since the let-off member is a relatively small component, and what is more, it is mounted between the key and the hammer, when performing assembly or maintenance of the keyboard device, the work for mounting the let-off member on the keyboard chassis or replacing the let-off member with a new one is troublesome, and takes much time and labor. Further, the engagement protrusion provided on the hammer and the let-off member provided on the flat plate of the keyboard chassis has a low degree of freedom in setting start timing and duration of let-off during key depression is low. Therefore, there is room for improvement of the keyboard device described above.

SUMMARY OF THE INVENTION

It is an object of the present invention to provide a keyboard device for a keyboard instrument, which is capable of not only making the keyboard device itself compact but also easily performing work for mounting or replacing let-off members, and further enhancing the degree of freedom in setting start timing and duration of let-off.

To attain the above object, the present invention provides a keyboard device for a keyboard instrument, which has a let-off function of imparting let-off feeling analogous to let-off of an acoustic piano, including a keyboard chassis having a plurality of partition walls each extending in a front-rear direction and arranged side by side in a left-right direction with a predetermined spacing therebetween, a plurality of keys each extending in the front-rear direction and arranged at an upper location in the keyboard chassis at respective associated locations between each adjacent ones of the partition walls, and a plurality of hammers each extending in the front-rear direction, and pivotally supported on a hammer support shaft provided below an associated one of the keys such that the hammer extends between the adjacent partition walls, for each being pivotally moved during key depression in a manner interlocked with the associated key, wherein a let-off member is removably mounted on one of at least one of adjacent two of the partition walls and the hammer disposed between the two partition walls, and wherein an engagement portion is provided on the other of the at least one of the adjacent two partition walls and the hammer disposed between the two partition walls, for being temporarily engaged with the let-off member during pivotal movement of the hammer caused by key depression, to thereby add let-off feeling to touch feeling of the key having been depressed.

With this construction, the keyboard chassis has the plurality of partition walls each extending in the front-rear direction and arranged side by side in the left-right direction with the predetermined spacing therebetween. The plurality of keys are disposed at the upper location in the keyboard chassis at associated locations between each adjacent ones of the partition walls. Further, the hammers are pivotally supported on the hammer support shaft provided below the associated one of the keys such that the hammer extends between the adjacent partition walls. Each hammer is pivotally moved during key depression in a manner interlocked with the associated key. Further, a let-off member is removably mounted on one of the partition wall and the hammer, and the engagement portion capable of being engaged with the let-off member is provided on the other of the partition wall and the hammer. When the hammer is pivotally moved in accordance with key depression, the engagement portion is temporarily engaged with the let-off member, whereby rotational resistance acts on the hammer being pivotally moved. With this, the touch weight of the key is temporarily increased, whereby let-off feeling analogous to that of the acoustic piano is added to the touch feeling of the key.

Since one of the let-off member and the engagement portion is provided on a partition wall disposed on a lateral side of the hammer, differently from the conventional keyboard device which has a let-off member or an engagement portion provided in an upper portion of or above the hammer, it is not required to secure a large space between the hammers and the key. With this, the keyboard device itself, which has the above-described let-off function, can be made compact. In addition, by disposing the let-off members and the engagement portions in the above-described positional relationship, the start timing and duration of let-off can be set relatively easily, whereby it is possible to enhance the degree of freedom in setting them. Further, since the let-off members are removably mounted on the partition walls or the hammers, it is possible to easily perform work for mounting or replacing the let-off members during assembly or maintenance of the keyboard device.

Preferably, the let-off member is made of an elastic material and is mounted on each of the adjacent two partition walls, and the engagement portion is provided on each of left and right sides of the hammer and is configured to be capable of being engaged with each let-off member mounted on the adjacent two partition walls, during the pivotal movement of the hammer caused by key depression.

With the construction of this preferred embodiment, the let-off member made of an elastic material is mounted on each of the adjacent two partition walls. On the other hand, the engagement portion is provided on each of the left and right sides of the hammer. During the pivotal movement of the hammers caused by key depression, the left and right engagement portions of the hammer are engaged with the left and right let-off members mounted on the adjacent two partition walls. By thus causing the left and right engagement portions of the hammer to be engaged with the left and right let-off members, it is possible to cause smooth pivotal movement of the hammer while suppressing lateral swing of the hammer and obtain stable let-off feeling.

More preferably, the let-off member includes a mounting portion mounted on the partition wall, at a predetermined location from below, and an engagement protrusion provided below the mounting portion and having a bent surface bent convex toward the hammer with which the engagement protrusion is to be engaged.

With the construction of this preferred embodiment, the let-off member includes the above-described mounting portion and engagement protrusion. Since the mounting portion is mounted on the partition wall, at the predetermined location from below, it is possible to easily perform work for mounting the let-off member on the partition wall. Further, the engagement protrusion has the bent surface bent convex toward the hammer. During the pivotal movement of the hammer caused by key depression, the engagement portion of the hammer is brought into contact with the bent surface of the engagement protrusion of the let-off member, whereby reaction force from the engagement protrusion acts on the hammer. With this, rotational resistance acts on the hammer, whereby let-off feeling is added to touch feeling of the key associated with the hammer. As described above, the let-off member constructed as above makes it possible to easily obtain let-off feeling.

Further preferably, the mounting portion of the let-off member is formed in a recessed shape open upward, which is capable of sandwiching the partition wall from both of left and right sides, and the partition wall includes a coming-off prevention portion that extends through the mounting portion from above for holding the mounting portion in a state prevented from coming off.

With the construction of this preferred embodiment, the mounting portion of the let-off member is formed in the recessed shape open upward, which is capable of sandwiching the partition wall from both of left and right sides, and the partition wall is provided with the coming-off prevention portion extending through the mounting portion from above. Therefore, the let-off member mounted on the partition wall sandwiches the partition wall from the left and right sides via the mounting portion, and is held in the state prevented from coming off. With this, the let-off member is firmly mounted on the partition wall in the left-right direction and the vertical direction, and even when each engagement portion of the hammer is repeatedly engaged in accordance with key depression, the let-off member is prevented from coming off from the partition wall.

Even more preferably, the keyboard chassis is provided with engagement lugs for each being engaged from below with the mounting portion of the let-off member mounted on the partition wall.

With the construction of this preferred embodiment, in the state where the let-off member is mounted on the partition wall, the mounting portion of the let-off member is engaged with the engagement lug from below, so that it is possible to more firmly mount the let-off member on the partition wall by the engagement lug in combination with the coming-off prevention portion.

More preferably, the engagement protrusion is formed by two engagement protrusions which are arranged with a spacing therebetween in the left-right direction and can be engaged with the two hammers disposed on the left and right sides of the partition wall on which the let-off member is mounted.

With the construction of this preferred embodiment, the engagement protrusion is formed by the two engagement protrusions arranged side by side with a spacing therebetween in the left-right direction. Further, out of the two engagement protrusions, the left engagement protrusion can be engaged with a hammer disposed on the left side of the partition wall on which the let-off member is mounted, whereas the right engagement protrusion can be engaged with a hammer disposed on the right side of the partition wall. By thus enabling two hammers adjacent to each other to be engaged with a single let-off member, it is possible to impart let-off feeling to two keys associated with the two hammer by the single let-off member.

Further preferably, the two engagement protrusions are disposed in a state displaced from each other in the front-rear direction.

With the construction of this preferred embodiment, the two engagement protrusions provided on the single let-off member are disposed in the state displaced from each other in the front-rear direction, and hence e.g. even when two keys adjacent to each other are simultaneously or successively depressed, and hammers associated with the keys are engaged with the two engagement protrusions of the single let-off member, respectively, it is possible to suppress interference, such as collision, between the two engagement protrusions. With this, even when two keys adjacent to each other are depressed, it is possible to obtain stable let-off feeling.

More preferably, the let-off member is configured such that when the engagement portion of the hammer is engaged with the engagement protrusion from above, resistance force acting on the hammer becomes smaller than resistance force acting on the hammer when the engagement portion is engaged with the engagement protrusion from below.

With the construction of this preferred embodiment, pivotal movement of the hammer in a predetermined direction in accordance with key depression causes the engagement portion of the hammer to be engaged with the engagement protrusion of the let-off member from below (hereinafter referred to as “the first-time engagement” in this section), and the engagement is released. Further, the pivotal movement of the hammer in a direction opposite to the above-mentioned direction by release of the depressed key causes the engagement portion of the hammer to be engaged with the engagement protrusion of the let-off member from above (hereinafter referred to as "the second-time engagement" in this section), and the engagement is released. In short, a single key depression causes the engagement portion of the hammer to be engaged with the let-off member two times. With the above-described construction, the let-off member is configured such that resistance force acting on the hammer by the second-time engagement becomes smaller than resistance force acting on the hammer by the first-time engagement. With this, it is possible to obtain clear let-off feeling, similar to click feeling, by the first-time engagement caused by depression of the key. Note that in the second engagement caused by releasing the depressed key, since the resistance force acting on the hammer is small, the let-off feeling mentioned above is not generated.

Further preferably, a plurality of let-off members are prepared as a unit component in which the let-off members are disposed in a state arranged side by side in a manner associated with the plurality of partition walls on which the let-off members are to be mounted, respectively, and are integrally formed with each other in a state continuous with a connection portion having a belt shape via each mounting portion, and the unit component is configured such that when assembling the keyboard device, the connection portion is separated, after the plurality of let-off members have been mounted on the plurality of partition walls, respectively, from the let-off members.

With the construction of this preferred embodiment, the plurality of the let-off members are prepared as the unit component in which the let-off members are integrally formed with each other in the state continuous with connection portion having a belt shape via each mounting portion. Further, in the unit component, the plurality of the let-off members are disposed in the state arranged side by side in a manner associated with the plurality of partition walls on which the let-off members are to be mounted. Therefore, when assembling the keyboard device, the plurality of let-off members are mounted on partition walls associated therewith, and then by separating the connection portion of the unit component from the let-off members, it is possible to efficiently perform the work for mounting the let-off members on the partition walls.

Further preferably, each of the plurality of let-off members is provided with a symbol corresponding to a partition wall on which the let-off member is to be mounted.

With the construction of this preferred embodiment, each of the plurality of let-off members is provided with a symbol corresponding to the partition wall on which the let-off member is to be mounted, so that e.g. during maintenance of the keyboard device, even when the plurality of let-off members have been removed from the partition walls, it is possible to easily mount the let-off members on proper partition walls while checking the symbol given to the let-off member.

Preferably, the let-off member is made of an elastic material, mounted on the hammer, and formed in a manner protruding outward from left and right side surfaces of the hammer, and the engagement portion is formed on each of opposed surfaces of adjacent two of the partition walls.

With the construction of this preferred embodiment, the let-off members, made of an elastic material, are mounted on the hammer, and are formed in a manner protruding outward from the left and right side surfaces of the hammer. On the other hand, the engagement portions are formed on the respective surfaces, which are opposed to each other, of the adjacent two partition walls. During the pivotal movement of the hammer in accordance with the depression of the key, the let-off members protruding from the left and right side surfaces of the hammer are engaged with the engagement portions formed on the partition walls on the opposite sides of the hammer. As described above, since the let-off members of the hammer are engaged with the engagement portions of the adjacent two partition walls, it is possible to obtain excellent let-off feeling by the engagement between theses.

More preferably, the engagement portion includes two engagement portions which are formed in a manner protruding from predetermined locations of the respective opposed surfaces of the adjacent two partition walls, and the let-off member includes a fixing portion fixed to an upper portion of the hammer, two left and right side walls continuous with the fixing portion and vertically extending along the left and right side surfaces of the hammer, respectively, and two left and right sloped portions protruding obliquely upward from the two left and right side walls over a predetermined length, respectively.

With the construction of this preferred embodiment, the engagement portions are comprised of two engagement portions which protrude from predetermined locations of the respective surfaces, which are opposed to each other, of the adjacent two partition walls. On the other hand, the let-off member includes the fixing portion, the two left and right side walls, and the two left and right sloped portions. During the pivotal movement of the hammer in accordance with the depression of the key, the two left and right sloped portions of the let-off members are engaged from below with the engagement portions of the partition walls on the opposite sides of the hammer, whereby reaction force from the two engagement portions acts on the hammer. With this, since rotational resistance acts on the hammer, it is possible to stably add let-off feeling to touch feeling of the key associated with the hammer. Note that although during the pivotal movement of the hammer after release of the depressed key, the two left and right sloped portions of the let-off members are engaged from above with the engagement portions of the partition walls on the opposite sides of the hammer, since the sloped portions protrude obliquely upward from the side walls of the hammer, the rotational resistance that acts on the hammer is smaller compared with the case where the sloped portions of the let-off members are engaged with the engagement portions from below.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key on a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 8A and 8B are diagrams useful in explaining an essential part of the present invention, in which FIG. 8A is a plan view of a chassis body of the keyboard chassis in which a let-off member according to a first embodiment is mounted on every rib, and FIG. 8B is a cross-sectional view taken along line B-B in FIG. 8A;

FIGS. 15A and 15B are perspective views of a unit component which is formed, when assembling the keyboard device, by integrally forming a plurality of let-off members with each other before the let-off members are mounted on the ribs of the chassis body, in which FIG. 15A shows a state as viewed obliquely from above, and FIG. 15B shows a state as viewed obliquely from below;

FIGS. 17A and 17B are views showing the let-off member of the second embodiment, in which FIG. 17A is a perspective view of the let-off member and FIG. 17B is a front view of the let-off member;

DETAILED DESCRIPTION OF PREFERRED EMBODIMENTS

Figure 1A:
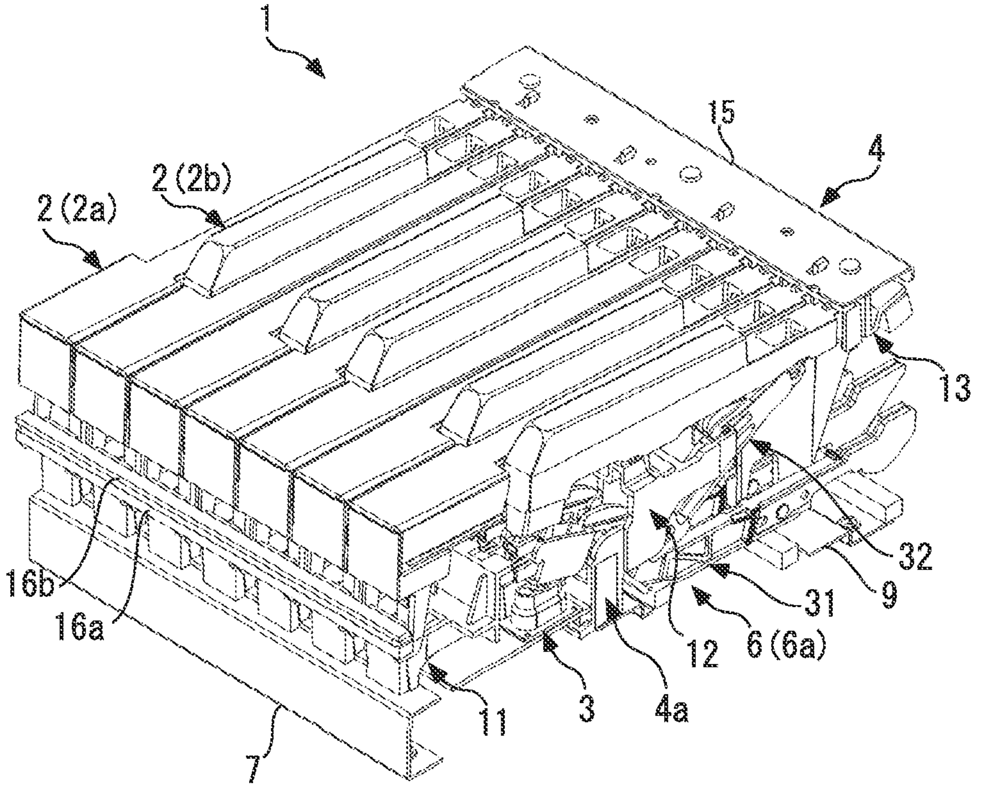

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic arrangement of the keyboard device 1 and operation thereof, and then of an essential part of the present invention.

Figure 1B:
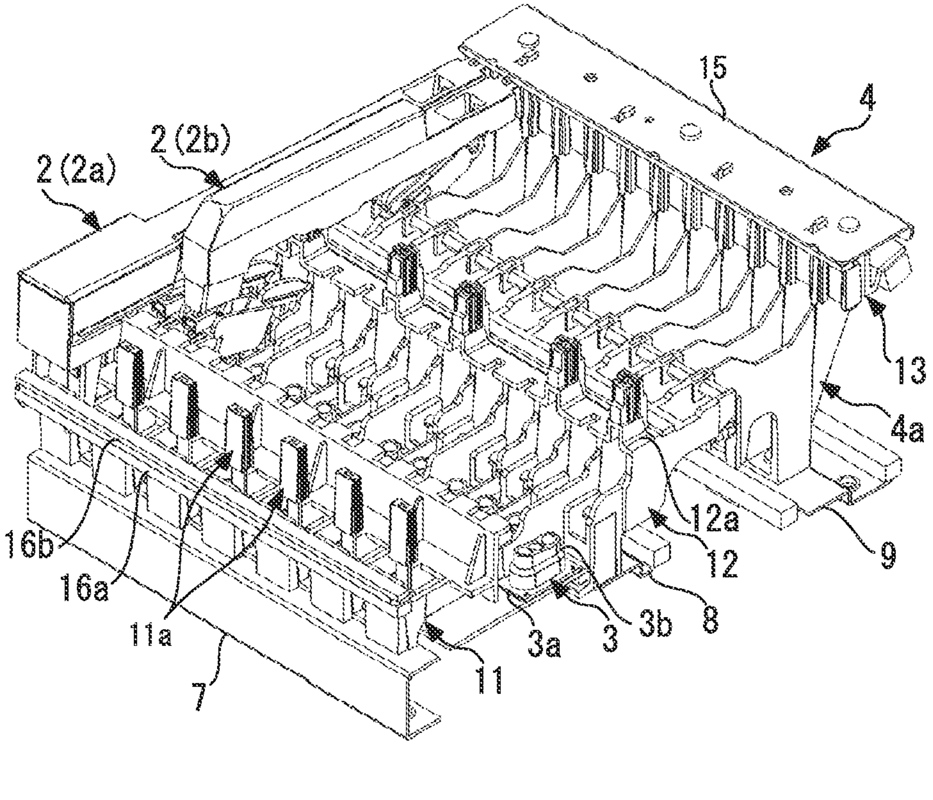
Figure 2:
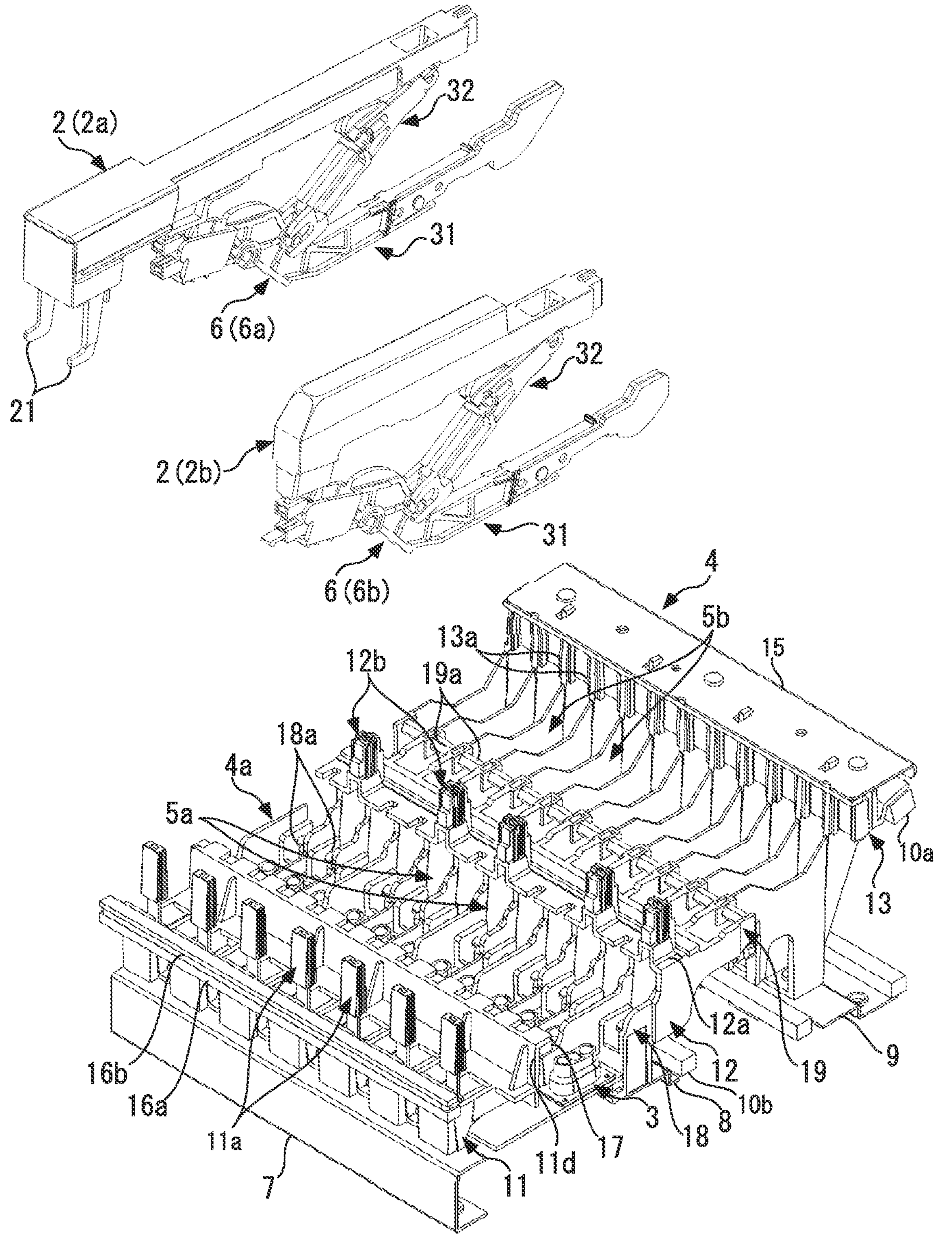
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B in which the white key 2*a* and the black key 2*b* are removed together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4 for an associated one of the keys 2, for supporting an associated key 2 from below, and key switches 3 each for detecting key depression information of an associated one of the keys 2.

Figure 3A:
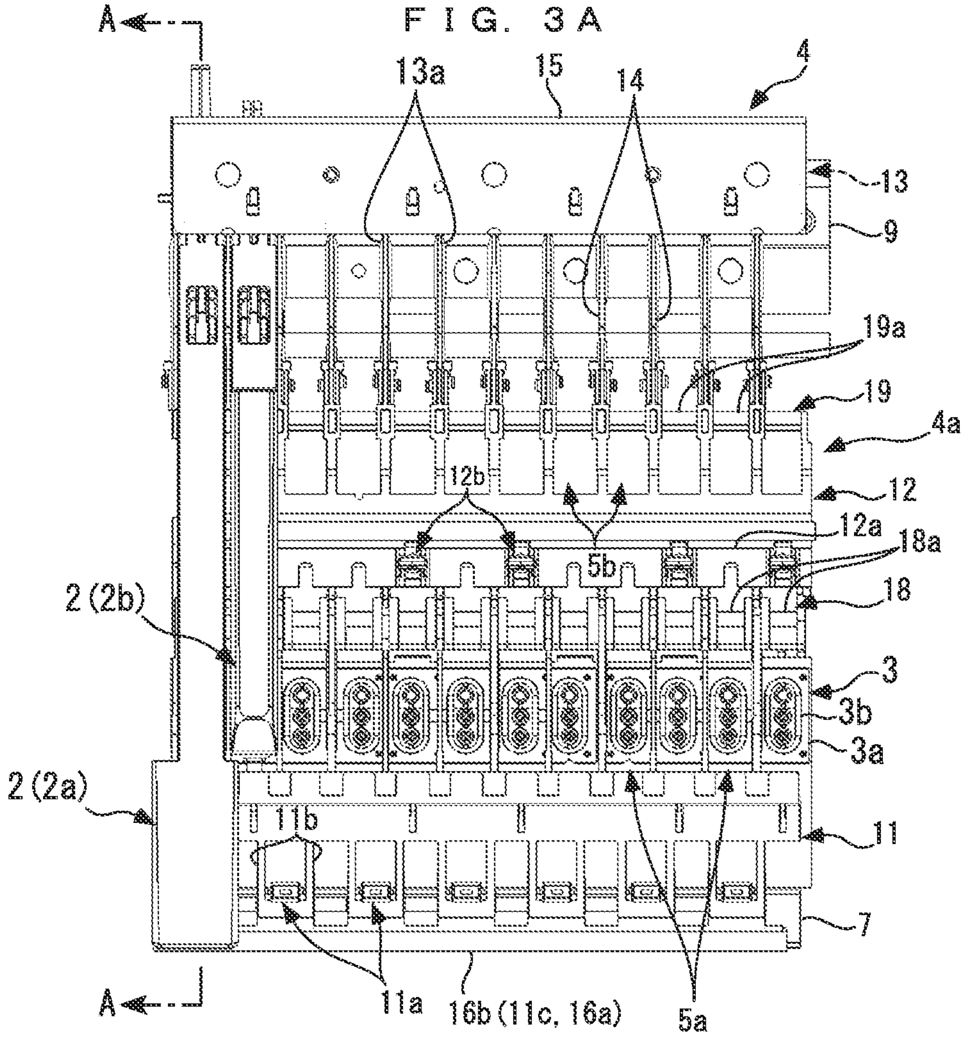
FIG. 3A is a plan view of the keyboard device shown in FIG. 1B
Figure 3B:
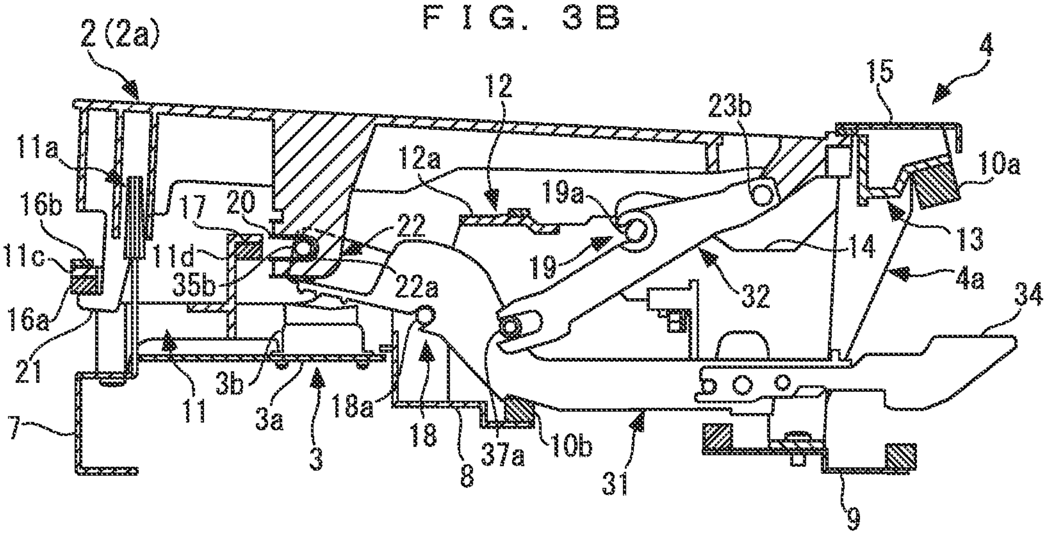
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other by a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided in the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the above-mentioned rails 7 and 9.

Figure 4A:
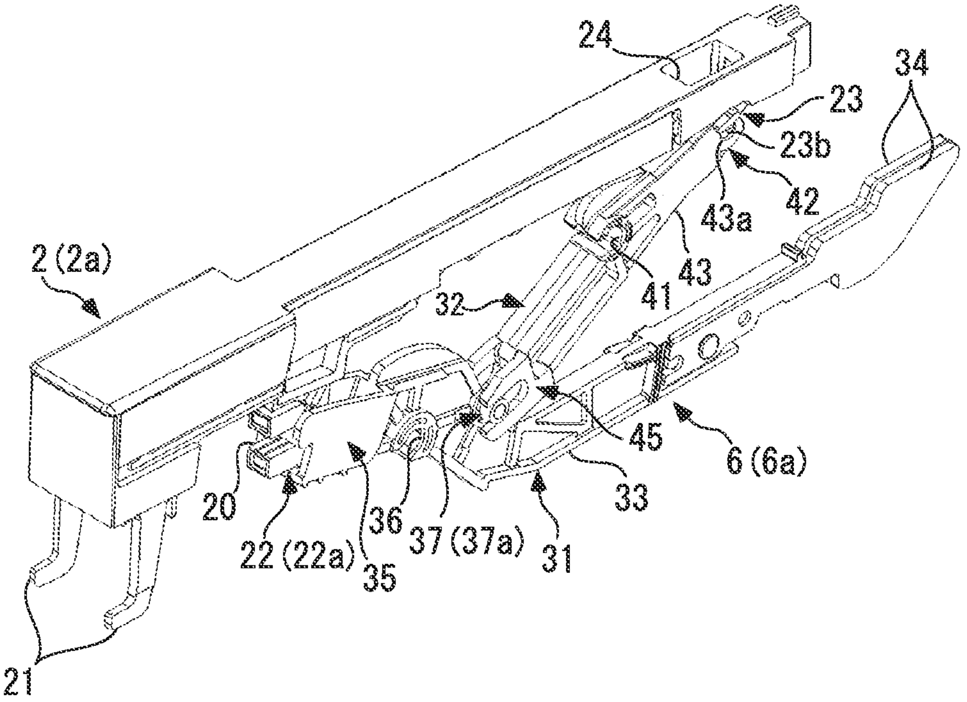
Figure 4B:
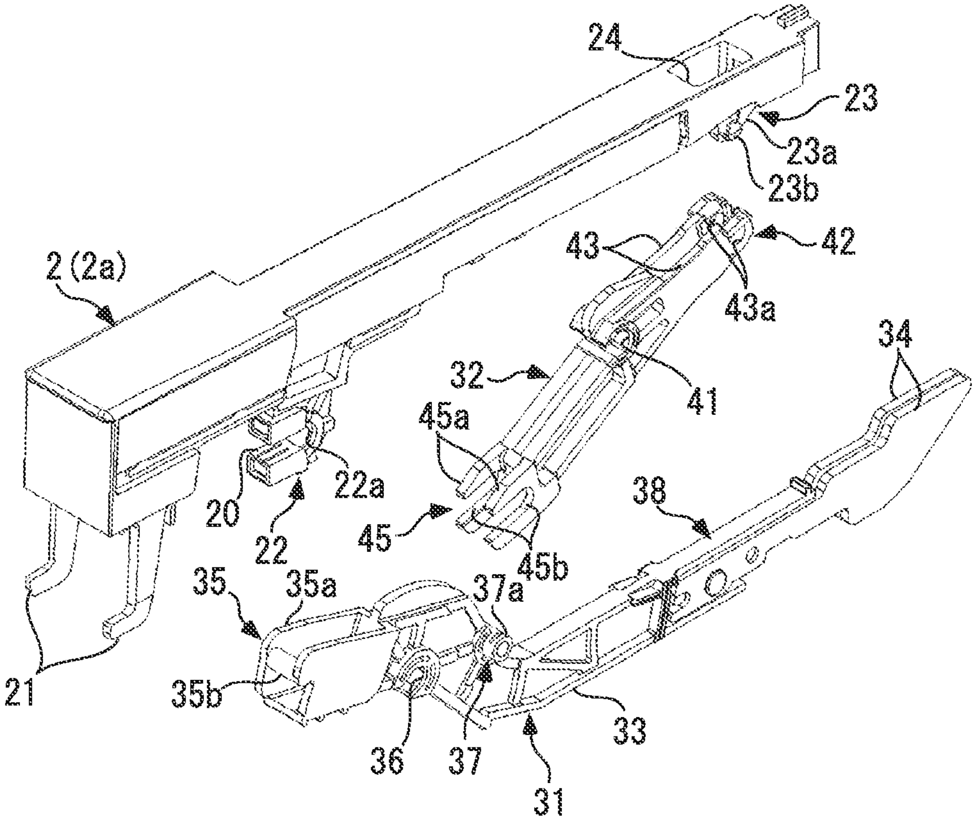

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* which has a U shape having a slot-like shape in side view and open forward. Further, the connecting recess 22*a* has a key-side noise suppressing member 20 attached thereto, which is formed to cover the whole inner peripheral surface of the connecting recess 22*a*, for suppressing generation of noise when a connecting shaft 35*b*, referred to hereinafter, of the first arm 31 slides in the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, a rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
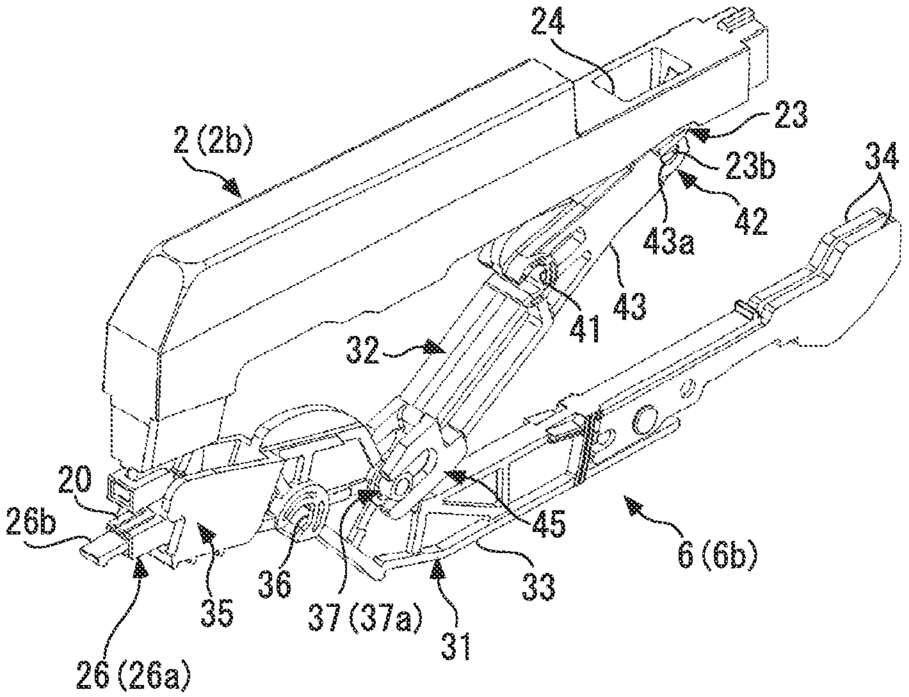
Figure 5B:
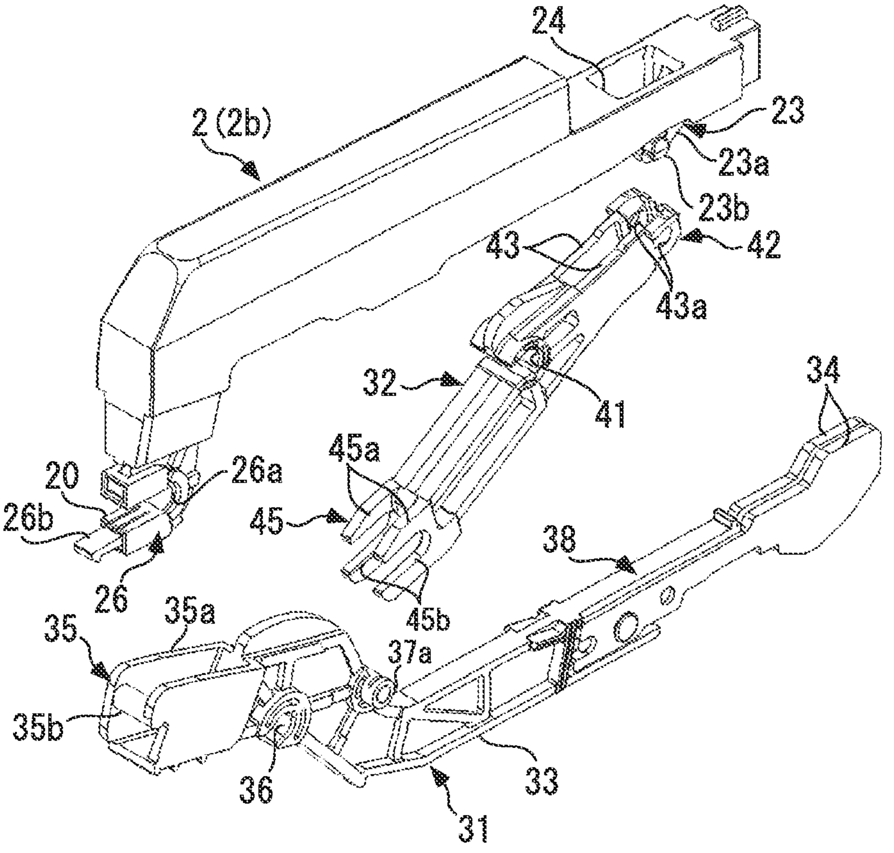

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
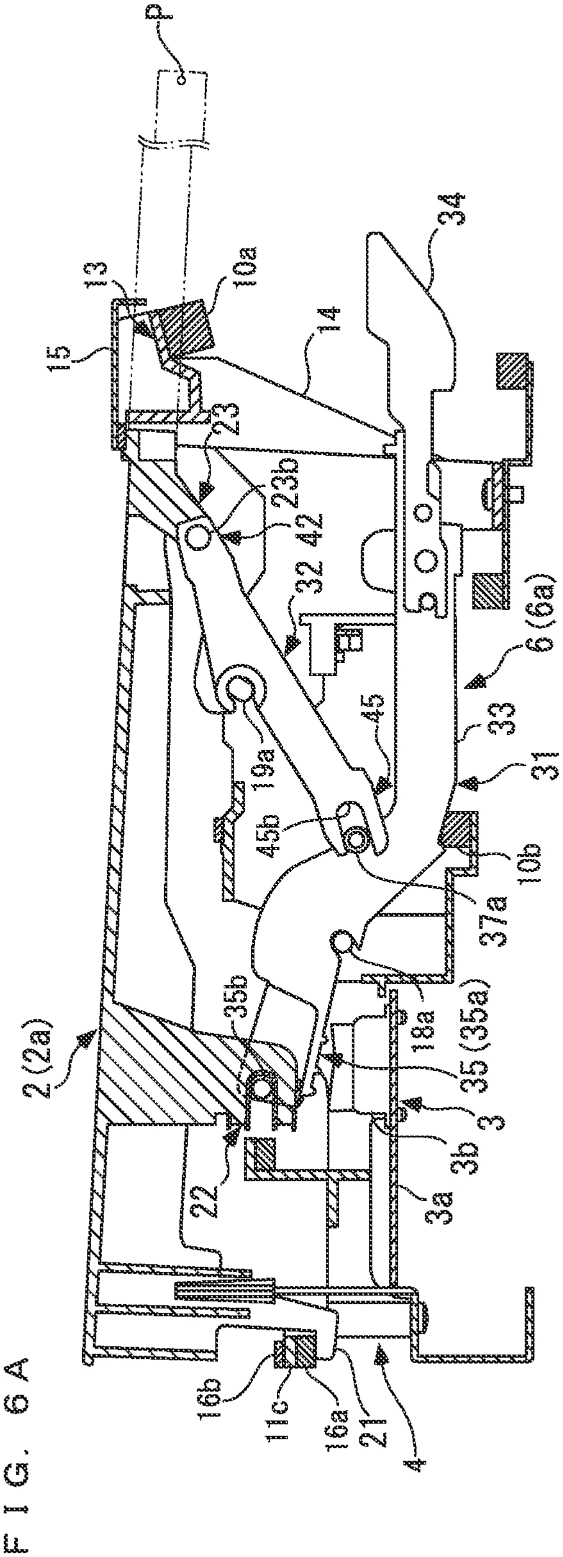
Figure 6B:
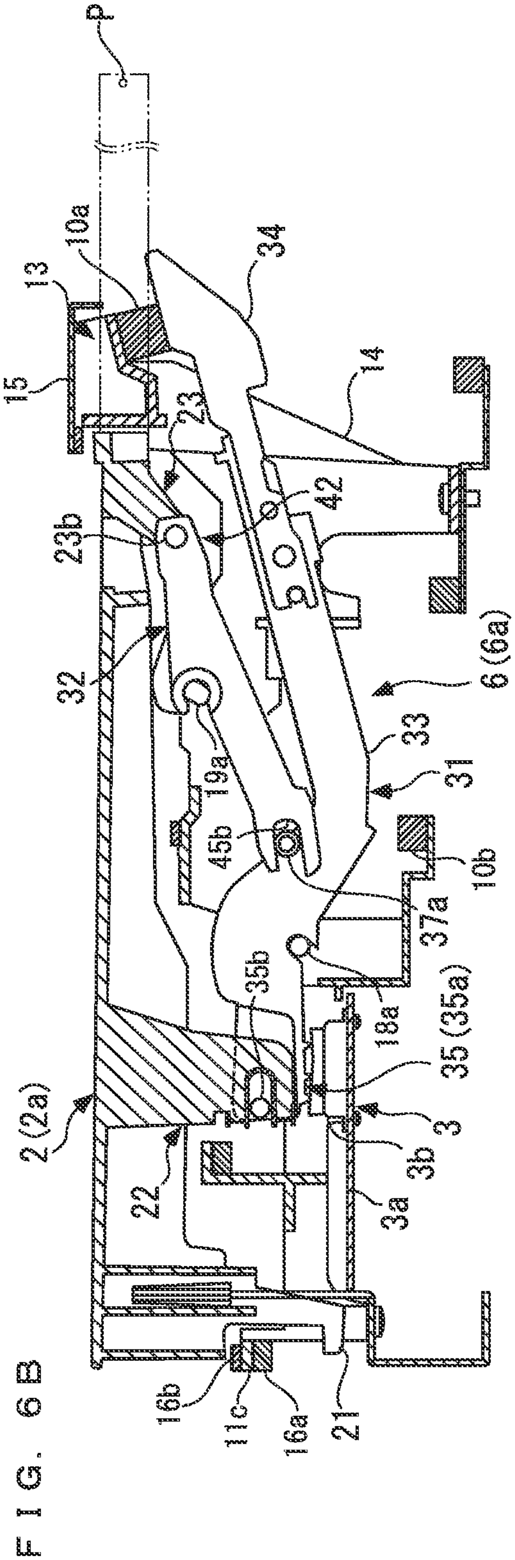
Figure 7A:
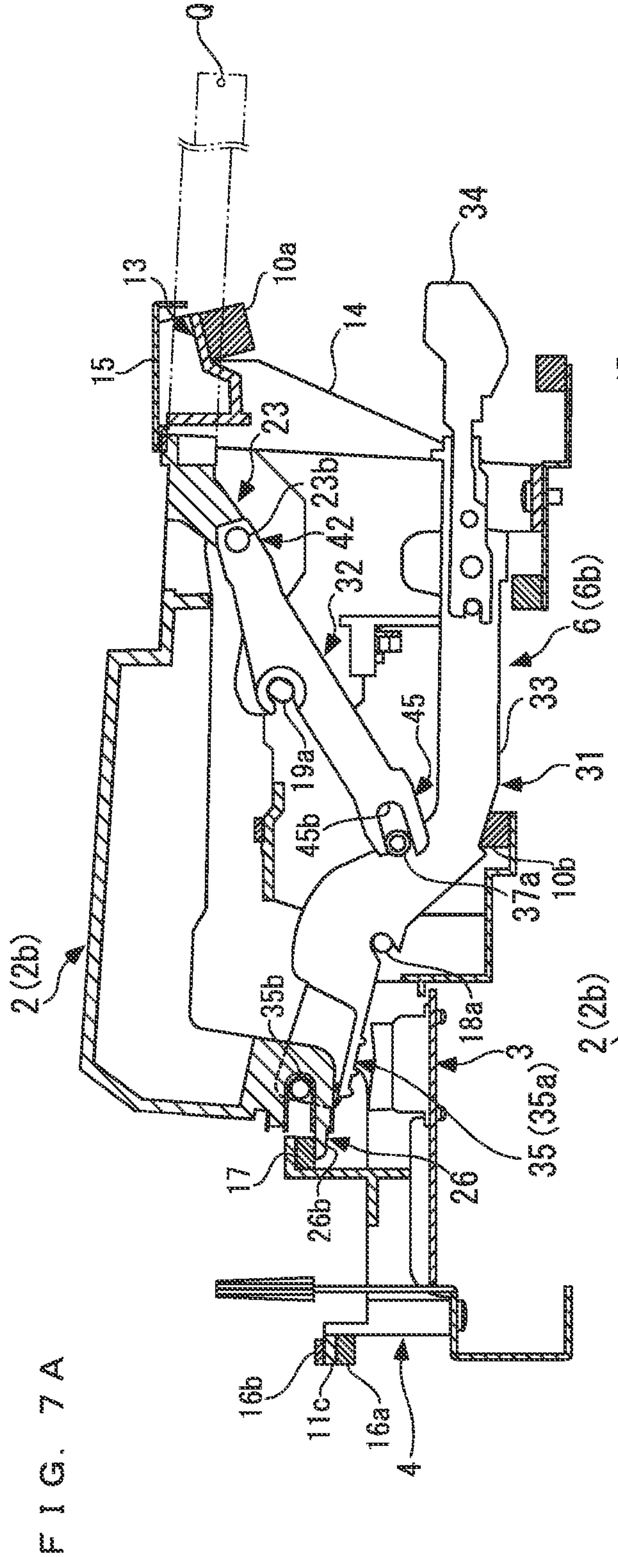
Figure 7B:
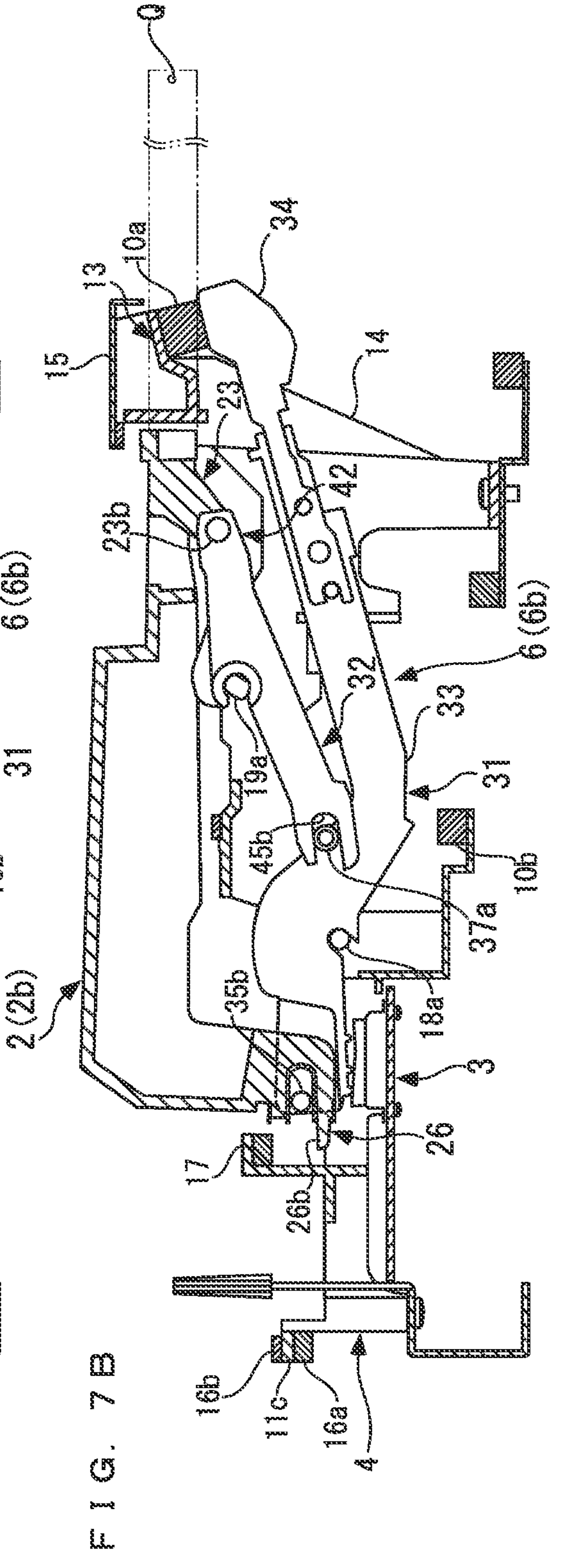

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* moves downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, moves upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 moves downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is tilted such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* becomes approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is located lower by a predetermined key stroke (e.g. 10 mm) and the rear end of the white key 2*a* is located lower by a distance (e.g. 5 mm), which is approximately half of the above key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked, and the white key 2*a* returns to its original key-released state.

Further, operation in response to depression of the black key 2*b* is performed similar to the above-described operations of the white key 2*a* and the key support mechanism 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is located lower by a predetermined key stroke and the rear end thereof is located lower by a distance which is approximately half of the above key stroke.

On the other hand, when the finger is released from the black key 2*b* having been depressed, the first arm 31 and the second arm 32 of the key support mechanism 6*b* pivotally move in a direction opposite to the above-mentioned direction, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8A to 19F. The essential part of the present invention is that the keyboard device 1 is provided with a let-off function. Specifically, one of the first arm 31 (hammer) and the rib 14 (partition wall) disposed on a lateral side of the first arm 31 is formed with a let-off member, and the other of the first arm 31 and the rib 14 is formed with an engagement portion that is capable of being engaged with the let-off member, and during pivotal movement of the first arm 31 caused by key depression, the let-off member and the engagement portion are temporarily engaged with each other, whereby let-off feeling is added to the touch feeling of a depressed one of the keys 2.

Figure 8A:
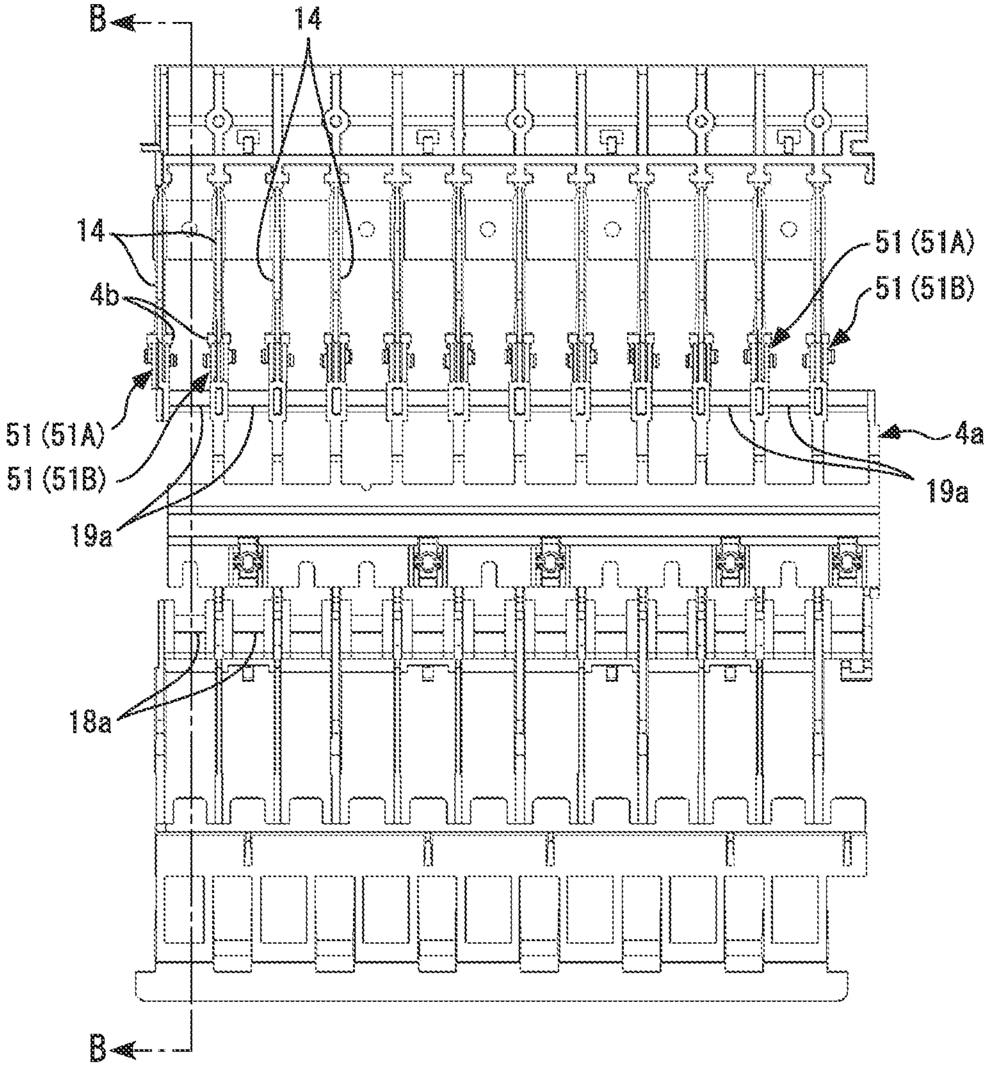
Figure 8B:
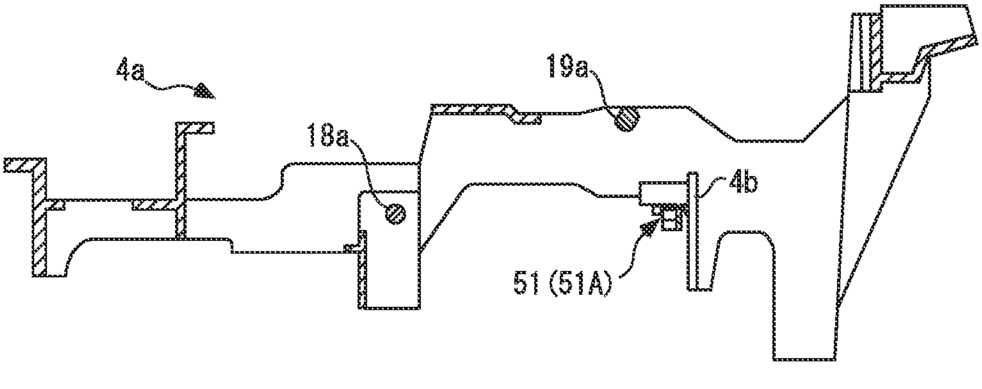

First, a first embodiment in which a let-off member 51 is provided on the rib 14, and the engagement portion is provided on the first arm 31 will be described with reference to FIGS. 8A to 15B. FIGS. 8A and 8B show states in which let-off members 51 are mounted on all the plurality of (twelve in FIG. 8A) ribs 14 in the chassis body 4*a* of the keyboard chassis 4. FIG. 8A is a plan view of the chassis body 4*a*, and FIG. 8B is a side cross-sectional view taken along line B-B of FIG. 8A. As shown in FIGS. 8A and 8B, each let-off member 51 is mounted on an associated one of the ribs 14 at a predetermined location obliquely downward and rearward of an associated one of the second pivot shafts 19*a*.

Note that although each let-off member 51 has the same basic construction, as described hereinafter, one of left and right engagement protrusions 54 and 55 is located forward of the other, and in the following description, the let-off member 51 having the right engagement protrusion 55 located forward of the left engagement protrusion 54 is referred to as type A and denoted by a reference numeral 51A, whereas the let-off member 51 having the left engagement protrusion 54 located forward of the right engagement protrusion 55 is referred to as type B and denoted by a reference numeral 51B. Further, if type A and type B are not particularly distinguished from each other, the let-off member is denoted by the reference numeral 51.

Figure 9:
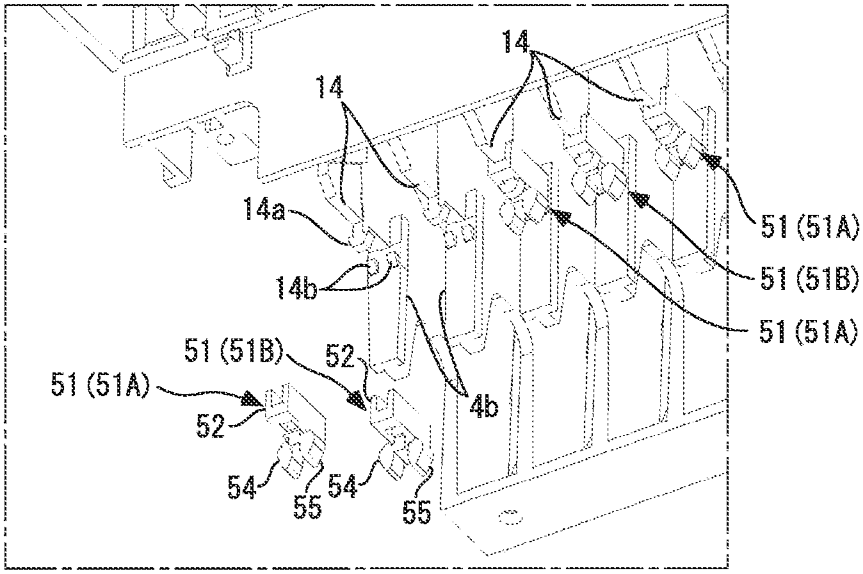
FIG. 9 is a perspective view of the chassis body, as viewed obliquely from below, with a plurality of let-off members in the center, in a state in which two let-off members on the left side are removed from associated ones of the ribs.
Figure 10A:
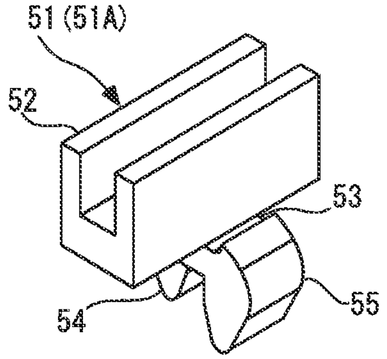
FIGS. 10A and 10B are perspective views of a let-off member of type A, as viewed obliquely from above and obliquely from below, respectively.
Figure 10C:
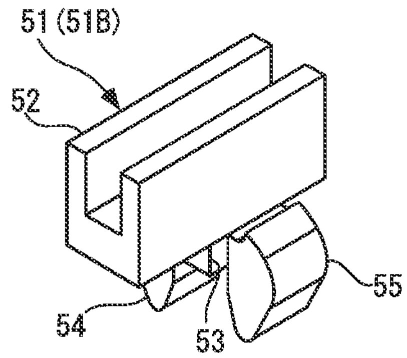
FIGS. 10C and 10D are perspective views of a let-off member of type B, as viewed obliquely from above and obliquely from below, respectively.
Figure 10B:
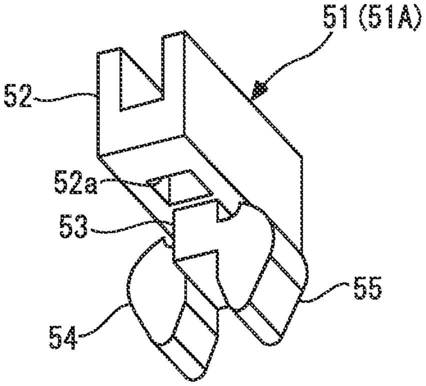
Figure 10D:
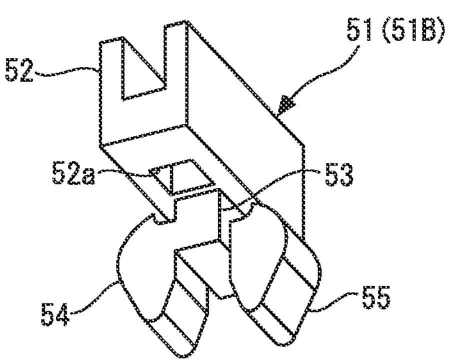

FIG. 9 shows the chassis body 4*a*, as viewed obliquely from below, with a plurality of let-off members 51 in the center, in a state in which the two let-off members 51A and 51B of type A and type B on the left side are removed from associated ones of the ribs 14 and 14, respectively. Further, FIGS. 10A and 10B shows the let-off member 51A of type A, as viewed obliquely from above and obliquely from below, respectively, and FIGS. 10C and 10D show the let-off member 51B of type B, as viewed obliquely from above and obliquely from below, respectively.

The let-off member 51 is formed as a molded article which is made of an elastic material (e.g. thermoplastic elastomer) and formed into a predetermined shape. As shown in FIGS. 10A and 10B, the let-off member 51 includes a mounting portion 52 extending a predetermined length in the front-rear direction and formed in a recessed shape open upward, a block-like base portion 53 provided on a rear half of a bottom surface of the mounting portion 52, and the two left and right engagement protrusions 54 and 55 provided on the left and right sides of the base portion 53, respectively, in a state protruding outward of the left and right side surfaces of the mounting portion 52.

Figure 11A:
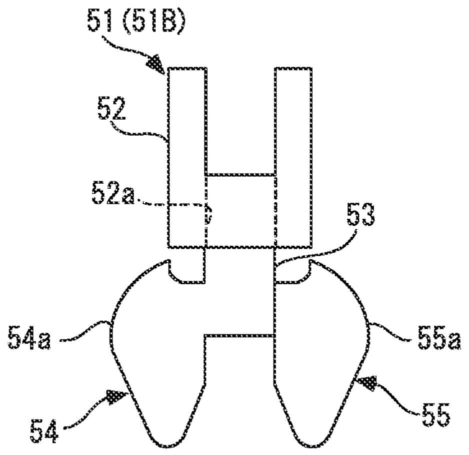
FIG. 11A is a front view of a let-off member.
Figure 11B:
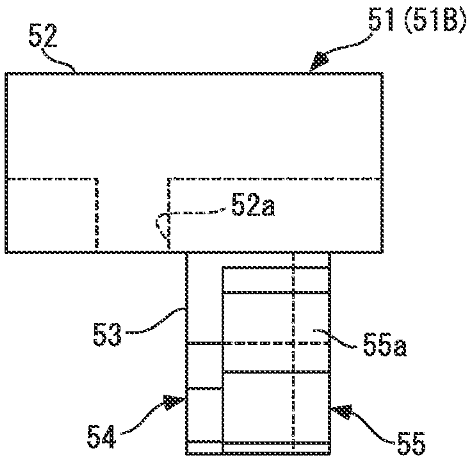
FIG. 11B is a right side view of the let-off member shown in FIG. 11A.

FIGS. 11A and 11B are a front view and a right side view of the let-off member 51, respectively. As shown in FIGS. 11A and 11B and FIGS. 10A to 10D, in the mounting portion 52 of the let-off member 51, there is formed a mounting hole 52*a* vertically extending therethrough at a location immediately forward of the base portion 53. Further, the left and right engagement protrusions 54 and 55 of the let-off member 51 each have a symmetrical shape in front view, and include bent surfaces 54*a* and 55*a* bent convex outward, respectively. Further, each of the engagement protrusions 54 and 55 has a portion downward of the base portion 53, which is formed to have a lateral width progressively reduced downward.

As shown in FIG. 9, at predetermined locations of each rib 14 on which an associated one of the let-off members 51 is mounted, a coming-off prevention portion 14*a* for securely attaching each let-off member 51 to the rib 14 and two left and right engagement lugs 14*b* and 14*b* are integrally provided on the chassis body 4*a*, respectively. The coming-off prevention portion 14*a* protrudes a predetermined length downward from a lower surface of the rib 14, and has a lower end formed with an increased-width portion which has a larger width than a portion of the coming-off prevention portion 14*a* upward of the lower end and is formed into a shape tapered downward. On the other hand, each engagement lug 14*b* is integrally provided on an arm guide 4*b*, referred to hereinafter, which is rearward of the coming-off prevention portion 14*a*, such that an upper surface thereof protrudes forward at the same height position as that of an upper end of the increased-width portion of the coming-off prevention portion 14*a*.

Figure 11C:
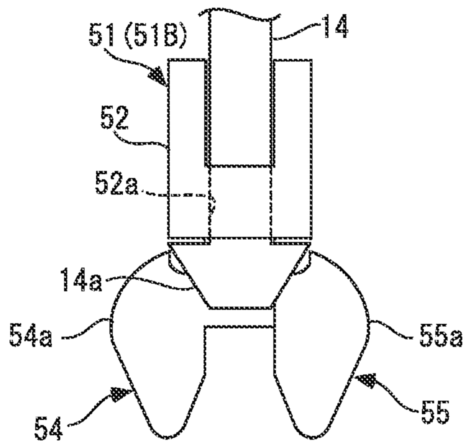
FIG. 11C is a front view of the let-off member mounted on an associated one of the ribs.
Figure 11D:
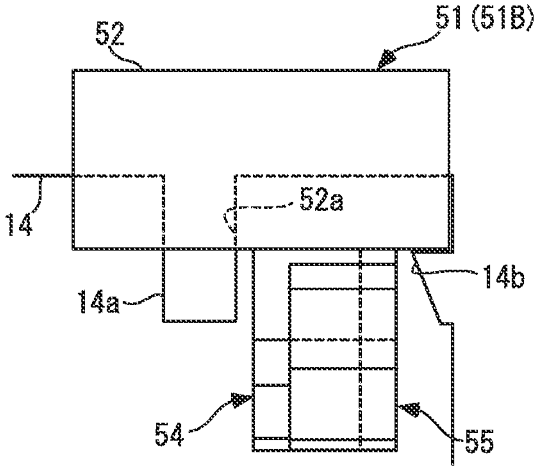
FIG. 11D is a right side view of the let-off member shown in FIG. 11C.

FIGS. 11C and 11D show a state in which the let-off member 51 has been mounted on the rib 14 by the coming-off prevention portion 14*a* and the engagement lugs 14*b*. As shown in FIGS. 11C and 11D, in the state in which the let-off member 51 has been mounted on the rib 14, the mounting portion 52 of the let-off member 51 sandwiches the rib 14 from the left and the right, and the increased-width portion formed on the lower end of the coming-off prevention portion 14*a* of the rib 14 extends through the mounting hole 52*a* of the mounting portion 52 from above. Further, the left and right engagement lugs 14*b* and 14*b* rearward of the coming-off prevention portion 14*a* is engaged with a rear end of a lower surface of the mounting portion 52 from below. As described above, each let-off member 51 is firmly mounted on the lower end of the associated one of the ribs 14 at a predetermined location.

Figure 12A:
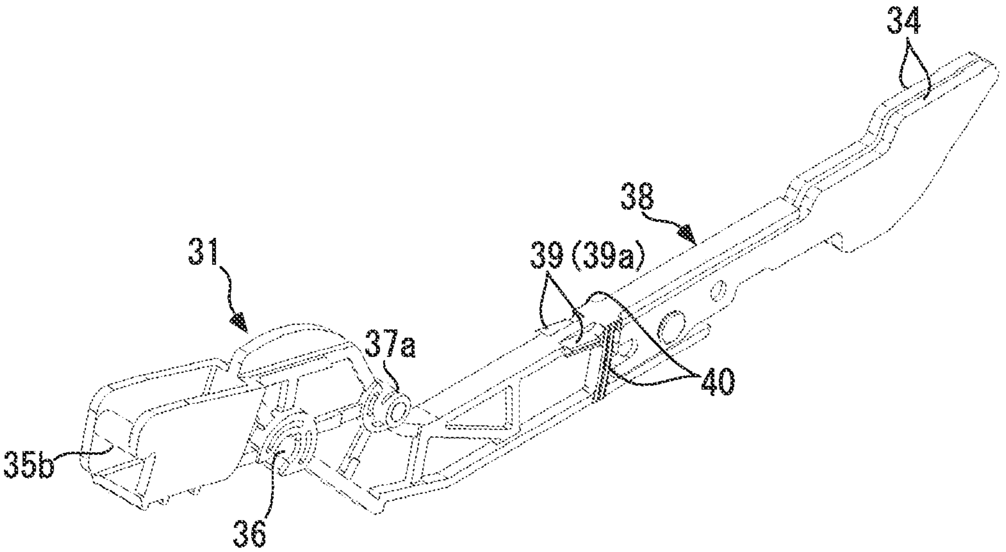
FIG. 12A is a perspective view of a first arm.
Figure 12B:
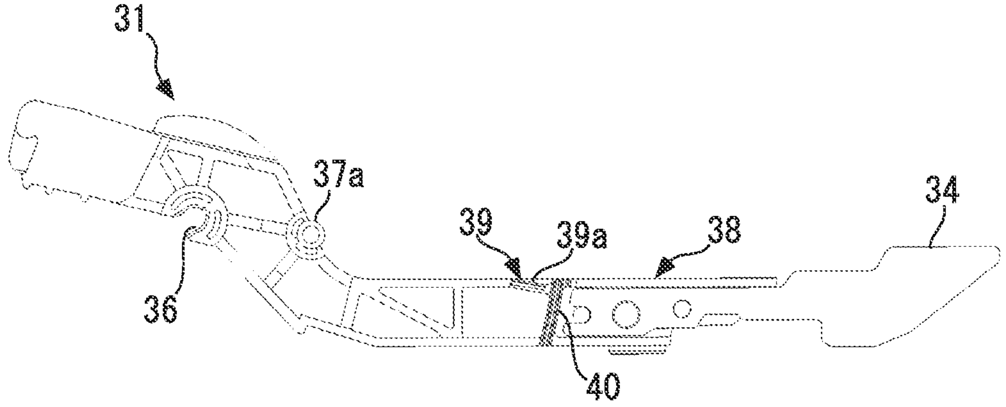
FIG. 12B is a right side view of the first arm.

FIGS. 12A and 12B show the first arm 31, in which FIG. 12A is a perspective view of the first arm 31, and FIG. 12B is a right side view of the first arm 31. As shown in FIGS. 12A and 12B, the first arm 31 is provided with two left and right engagement portions 39 and 39 which are temporarily engaged with the left and right let-off members 51 and 51 during pivotal movement of the first arm 31 caused by key depression. The two engagement portions 39 and 39 are provided at upper portions of the left and right sides of the first arm 31, more specifically, at predetermined locations rearward of the bearing portion 36 and the connecting shaft 37*a* and immediately forward of the weight mounting portion 38. Further, each engagement portion 39 is formed such that it protrudes in the lateral direction and an upper surface 39*a* thereof is slightly sloped downward toward the rear in a key-released state. With this, as described hereinafter, when the first arm 31 pivotally moves, the two engagement portions 39 and 39 are engaged with the engagement protrusions 55 and 54 of the left and right let-off members 51 and 51 in a horizontal state of each upper surface 39*a*.

Note that there are provided vertically extending guide protrusions 40 and 40 immediately rearward of the two engagement portions 39 and 39. The guide protrusions 40 and 40 are opposed to each other in a state in which the guide protrusions 40 are close to an associated one of arm guides 4*b* (see FIGS. 8A to 9) of the chassis body 4*a*, whereby when the first arm 31 pivotally moves, lateral swing of the first arm 31 is prevented.

Figure 13:
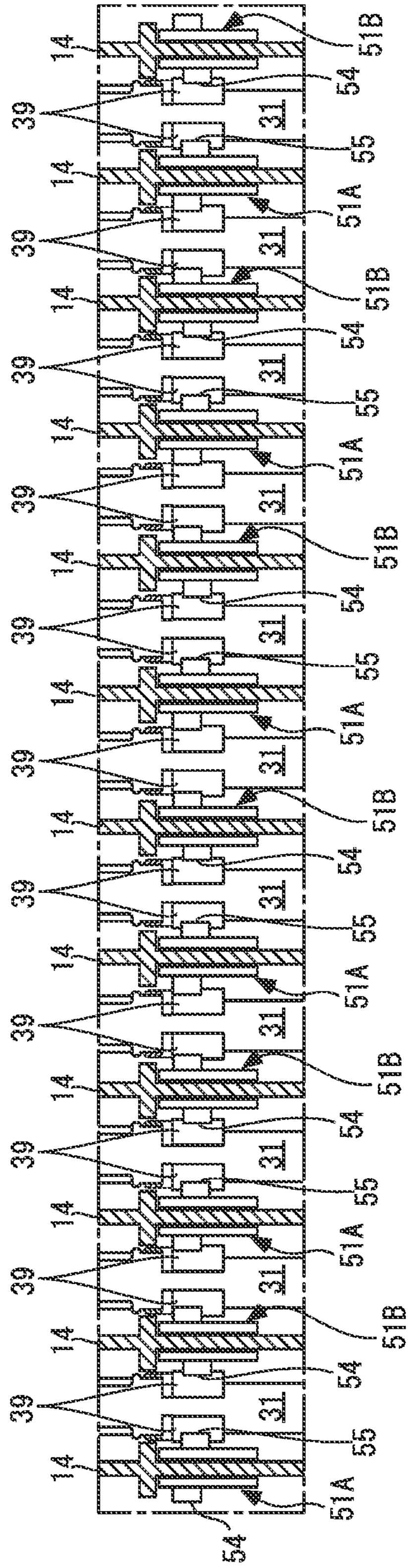
FIG. 13 is a partial plan view of the chassis body in which let-off members mounted on all the ribs and all first arms mounted on the same, respectively.

FIG. 13 is a plan view of the chassis body 4*a* in a state in which the let-off members 51 are mounted on all the ribs 14 of the chassis body 4*a*, and the first arms 31 are disposed between each adjacent two of the ribs 14, with the let-off members 51 and the engagement portions 39 of the first arms 31 in the center. Further, FIG. 13 shows a key-released state in which the engagement portions 39 of the first arms 31 are located below associated ones of the let-off members 51. As shown in FIG. 13, the let-off members 51A of type A and the let-off members 51B of type B are alternately mounted on the twelve ribs 14 of the chassis body 4*a* in order from the left. With this, the left and right engagement portions 39 and 39 of each first arm 31 can be engaged with the right engagement protrusion 55 of the left let-off member 51 and the left engagement protrusion 54 of the right let-off member 51 at the same location in the front-rear direction (in a vertical direction as viewed in FIG. 13), that is, at symmetrical locations.

Figure 14A:
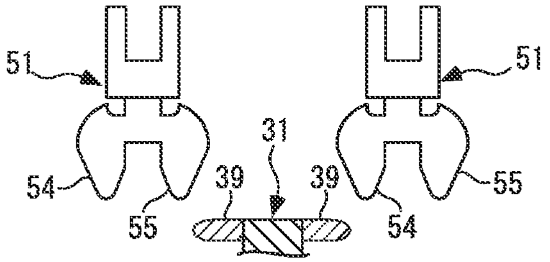
FIGS. 14A to 14F are views useful in explaining movements of the let-off members caused by pivotal movement of the first arm in accordance with key depression.

Now, the operation of the let-off member 51 caused by the pivotal movement of the first arm 31 in accordance with key depression will be described with reference to FIGS. 14A to 14F. FIG. 14A shows the left and right engagement portions 39 and 39 of the first arm 31 in the key-released state and the two left and right let-off members 51 and 51 mounted on the libs 14 and 14 (not shown in FIGS. 14A to 14F) disposed on the left and right sides of the first arm 31, respectively.

Figure 14B:
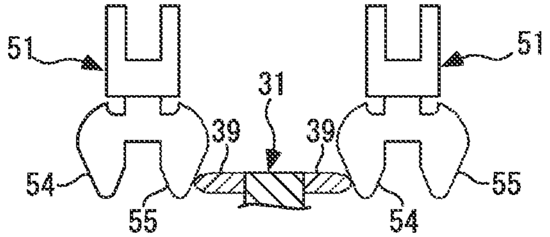
Figure 14C:
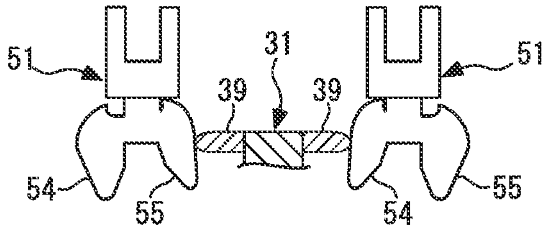
Figure 14D:
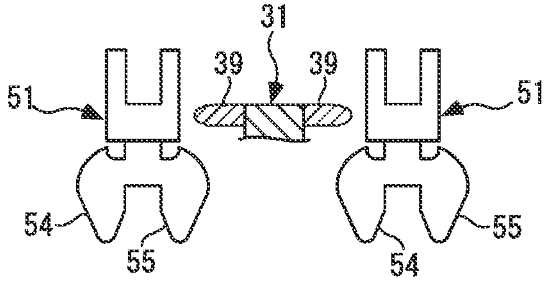

When one of the keys 2 is depressed, one of the first arms 31, which is associated with the depressed key 2, is pivotally moved in a predetermined direction, and in accordance therewith, the left and right engagement portions 39 and 39 of the first arm 31 are moved upward and are brought into contact with the right engagement protrusion 55 of the left let-off member 51 and the left engagement protrusion 54 of the right let-off member 51 from below (FIG. 14B). Then, when the key 2 is further depressed, the first arm 31 as well is further pivotally moved, whereby the left and right engagement portions 39 and 39 are moved upward while laterally pushing outward the engagement protrusions 55 and 54 of the left and right let-off members 51 and 51 (FIG. 14C), and reach a location higher than the engagement protrusions 55 and 54 (FIG. 14D). As described above, in the case where the engagement portions 39 and 39 of the first arm 31 being pivotally moved pass between the engagement protrusions 55 and 54 of the left and right let-off members 51 and 51 from below to above, reaction forces from the engagement protrusions 55 and 54 act on the engagement portions 39 and 39, whereby rotational resistance acts on the first arm 31. With this, let-off feeling is added to the touch feeling of the key 2 associated with the first arm 31, that is, the key 2 supported by the key support mechanism 6 having the first arm 31.

Figure 14E:
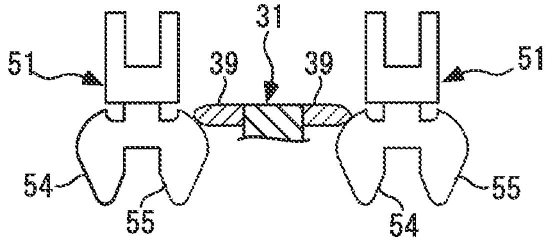
Figure 14F:
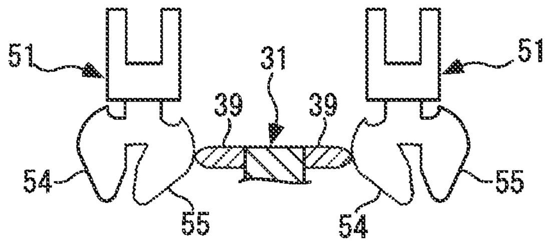

Then, when the depression of the key 2 is released, the key 2 pivotally moves upward, and the first arm 31 pivotally moves in a direction opposite to the above-mentioned direction. In accordance therewith, the left and right engagement portions 39 and 39 of the first arm 31 move downward into contact with the engagement protrusions 55 and 54 of the left and right let-off members 51 and 51 from above (FIG. 14E). Then, when the key 2 further moves upward, the first arm 31 as well further pivotally moves, and the left and right engagement portions 39 and 39 move downward while laterally pushing outward the engagement protrusions 55 and 54 of the left and right let-off members 51 and 51 (FIG. 14F), and return to the above-mentioned key-released state (FIG. 14A). As described hereinabove, in the case where the engagement portions 39 and 39 of the pivotally moving first arm 31 pass between the engagement protrusions 55 and 54 of the left and right let-off members 51 and 51 from above to below, the engagement protrusions 55 and 54 are easy to bend inward due to the structure thereof, and hence compared with the above-described case where the engagement portions 39 and 39 pass between the engagement protrusions 55 and 54 from below to above, the rotational resistance acting on the first arm 31 is very small. Therefore, when the key 2 having been depressed is released, the above-mentioned let-off feeling is not generated.

Figure 15A:
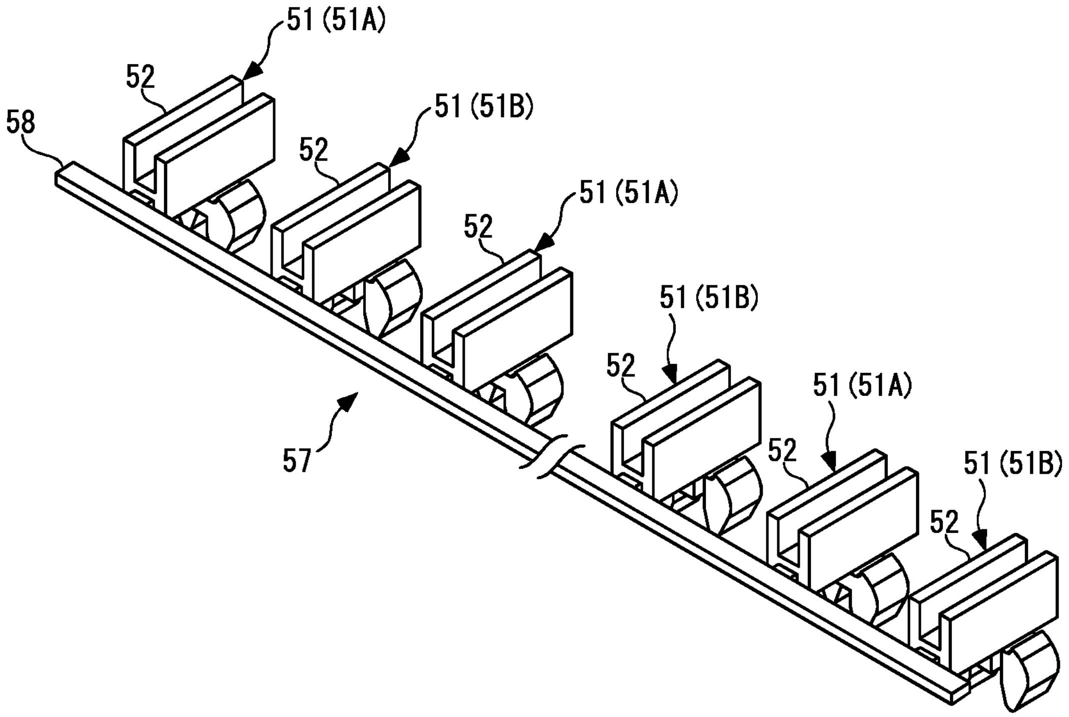
Figure 15B:
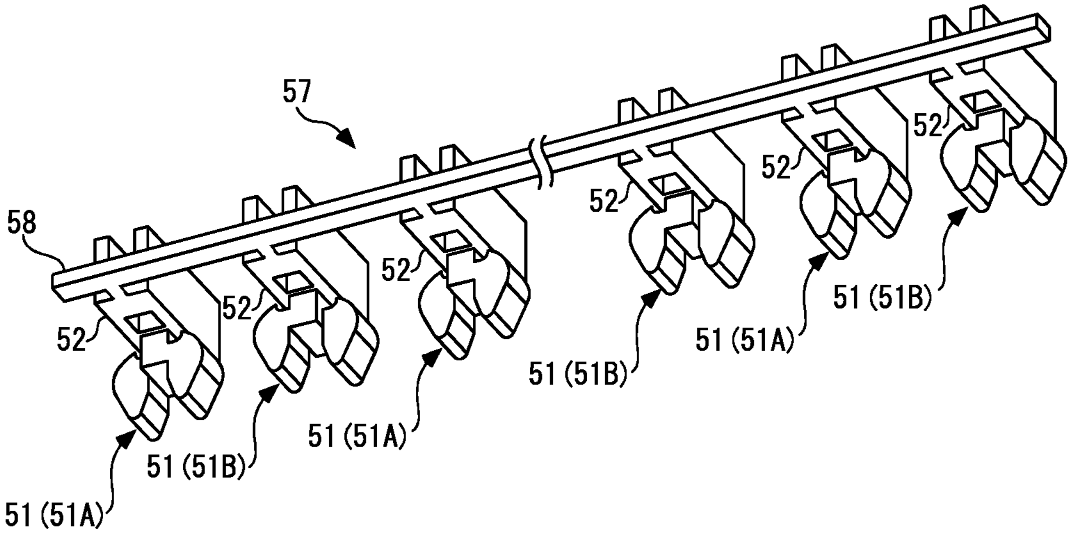

FIGS. 15A and 15B show a unit component 57 having a plurality of (e.g. twelve, only six of which are shown in FIGS. 15A and 15B) let-off members 51 integrally formed with each other. Before the let-off members 51 are mounted on a plurality of ribs 14 of the chassis body 4*a* for assembly of the keyboard device 1, the unit component 57 is in the state of the let-off members 51.

In the unit component 57, the mounting portion 52 of each let-off member 51 is configured such that part of a front end surface of a bottom wall thereof is continuous with a connection portion 58 formed into a belt shape extending a predetermined length. Further, in this unit component 57, the let-off member 51 is disposed in association with a rib 14 on which it should be mounted. More specifically, in the chassis body 4*a*, a lateral spacing between each adjacent two of the ribs 14 and 14 is different depending on the key 2 disposed in association with the spacing therebetween. On the other hand, all the keys 2 have first arms 31 constructed similar to each other in shape and size. Therefore, as described hereinabove, although each let-off member 51 has the same basic construction, the lateral width of the engagement protrusions 54 and 55 of each let-off member 51 is set according to the rib 14 on which the let-off member 51 should be mounted. For this reason, in the unit component 57, the let-off members 51 are sequentially arranged side by side in the longitudinal direction of the connection portion 58 according to the arrangement of the ribs 14 on which the let-off members 51 are to be mounted.

Further, as described above, each let-off member 51 is set according to the rib 14 on which it should be mounted, and therefore if the let-off member 51 is not appropriately mounted on an associated one of the ribs 14, there is a fear that no excellent let-off feeling can be obtained. In view of this, each let-off member 51 is provided with a symbol (including e.g. a code name of a key 2 on one of the left and right sides of the rib 14) associated with a rib 14, so as to make it possible to easily know the rib 14 on which the let-off member 51 should be mounted, even when any of the let-off members 51 is removed from an associated one of the ribs 14 e.g. for maintenance. For example, the above-mentioned symbol is given to e.g. a front side of the mounting hole 52*a* on the bottom surface of the mounting portion 52 of each let-off member 51, when the unit component 57 is molded.

Furthermore, the above-described connection portion 58 of the unit component 57 is configured to be easily manually separated from the let-off members 51. Therefore, during assembly of the keyboard device 1, after the let-off members 51 of the unit component 57 are mounted on associated ones of the ribs 14, respectively, by pulling out the connection portion 58 from the chassis body 4*a*, it is possible to easily separate the connection portion 58 from the let-off members 51.

As described heretofore, according to the keyboard device 1 including the above-described let-off members 51 of the first embodiment, when the first arm 31 is pivotally moved in accordance with depression of the key 2, the engagement portions 39 and 39 of the first arm 31 are temporarily engaged with the left and right let-off members 51 and 51, whereby rotational resistance acts on the first arm 31 being pivotally moved. With this, the touch weight of the key 2 is temporarily increased, whereby it is possible to add let-off feeling analogous to that of an acoustic piano to the touch feeling of the key 2.

Further, each let-off members 51 is provided on the rib 14 on the lateral side of the first arm 31, and hence differently from the conventional keyboard device, it is not required to secure a large space between the first arm 31 and the key 2. With this, the keyboard device 1 itself, which has the let-off function, can be made compact. In addition, by disposing the let-off members 51 and the engagement portions 39 and 39 of the first arm 31 in the positional relationship described above, it is possible to relatively easily set start timing and duration of let-off, and it is possible to enhance the degree of freedom in setting the start timing and duration of let-off.

Furthermore, in the let-off member 51, the left and right engagement protrusions 54 and 55 are disposed in a state displaced from each other in the front-rear direction, and hence e.g. even when adjacent two keys 2 and 2 are simultaneously or successively depressed and the first arms 31 associated with the respective keys 2 are each engaged with the two engagement protrusions 54 and 55 of a single let-off member 51, it is possible to suppress interference, such as collision, between the engagement protrusions 54 and 55. With this, even when adjacent two keys 2 and 2 are depressed, it is possible to obtain stable let-off feeling.

Further, the let-off members 51 are removably mounted on the ribs 14. Before assembling the keyboard device 1, the unit component 57 is formed by integrally forming a plurality of let-off members 51 with each other. Furthermore, each let-off member 51 is provided with a symbol associated with a rib 14 on which the let-off member 51 should be mounted. Therefore, during assembly or maintenance of the keyboard device 1, it is possible to easily perform work for mounting or replacing the let-off members 51.

Next, with reference to FIGS. 16A to 19F, a description will be given of a second embodiment in which a let-off member is provided on a first arm and engagement portions are provided on the ribs 14, contrary to the above-described first embodiment. Note that although a first arm 31A appearing in FIGS. 16A and 16B is different in shape from the above-described first arm 31, the first arm 31A has the same basic construction as that of the first arm 31, and hence the same component elements as those of the first arm 31 are denoted by the same reference numerals.

Figure 16A:
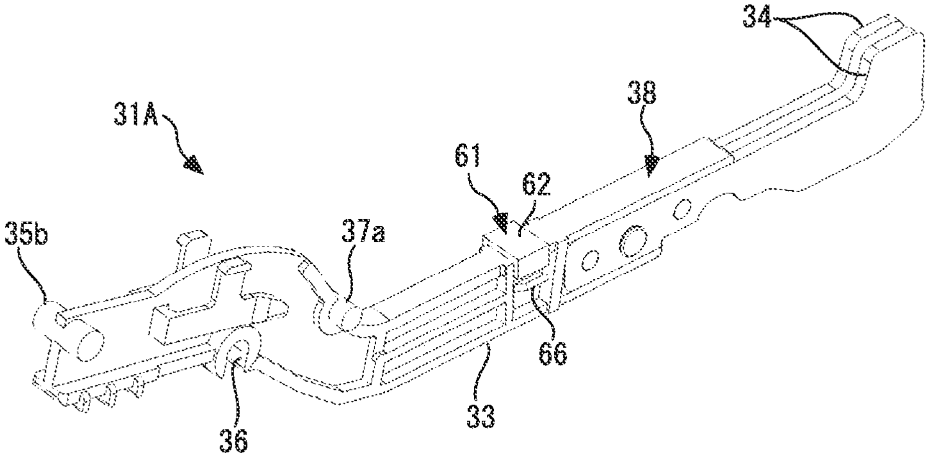
FIG. 16A is a perspective view of a first arm having a let-off member of a second embodiment mounted thereon.
Figure 16B:
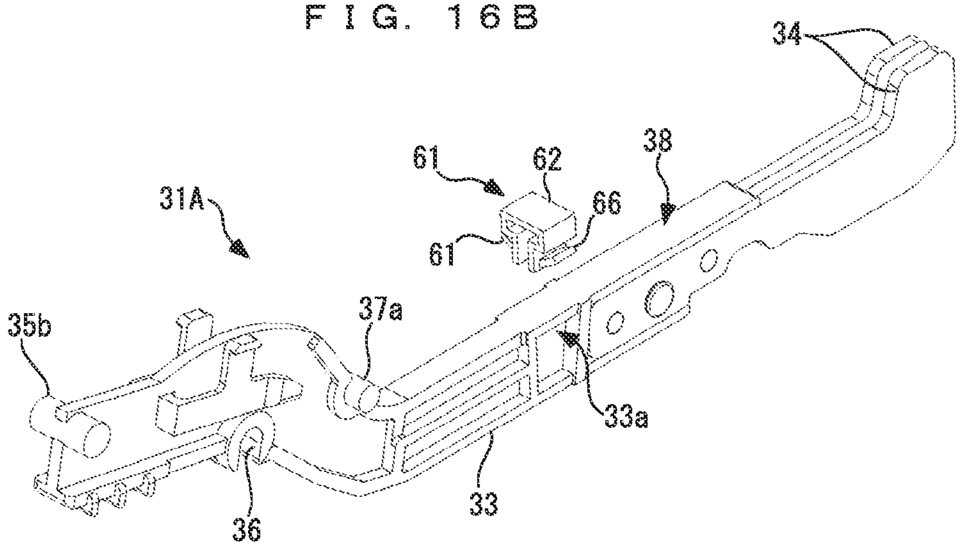
FIG. 16B is a perspective view of the first arm in a state in which the let-off member is removed from the first arm shown in FIG. 16A.

As shown in FIGS. 16A and 16B, a let-off member 61 is mounted on the first arm 31A, at a predetermined location. Specifically, the let-off member 61 is mounted on the first arm 31A, at the predetermined location rearward of the bearing portion 36 and the connecting shaft 37*a* and immediately forward of the weight mounting portion 38.

Figure 17A:
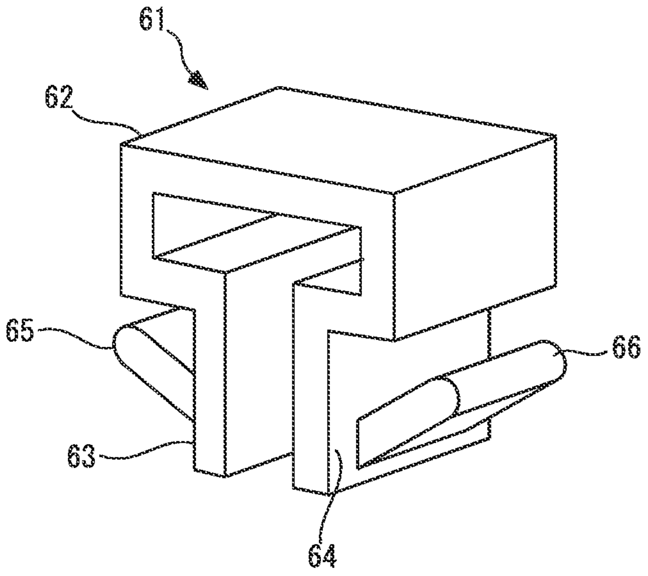
Figure 17B:
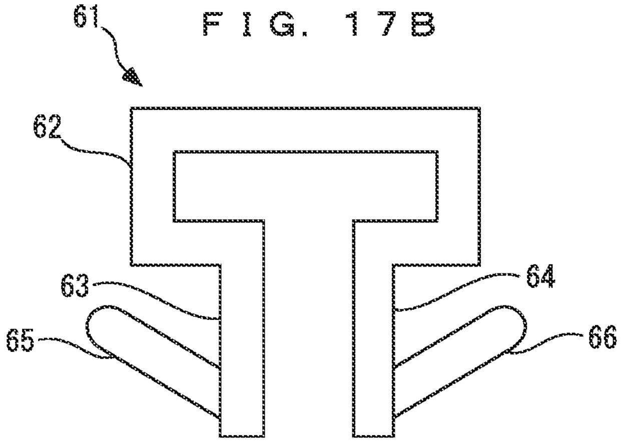

FIGS. 17A and 17B show the let-off member 61 on an enlarged scale. FIG. 17A is a perspective view of the let-off member 61 and FIG. 17B is a front view of the let-off member 61. As shown in FIGS. 17A and 17B, the let-off member 61 is formed by a molded article which is made of an elastic material (e.g. thermoplastic elastomer) and is formed into a symmetrical predetermined shape. Specifically, the let-off member 61 includes a fixing portion 62 for securing the let-off member 61 itself to the first arm 31A, left and right side walls 63 and 64 continuous with the fixing portion 62, and left and right sloped portions 65 and 66 protruding obliquely upward from outer surfaces of the respective left and right side walls 63 and 64.

The fixing portion 62 of the let-off member 61 is formed into a shape complementary to a shape (T shape) of a portion (hereinafter referred to as "the mounting portion 33*a*" as deemed appropriate) on which the first arm 31A is mounted, such that the left and right opposite ends of the fixing portion 62 extend around downward. Further, the left and right side walls 63 and 64 continuous with a lower portion of the fixing portion 62 vertically extend downward parallel to each other over a predetermined length with a predetermined spacing substantially equal to a lateral width of the mounting portion 33*a* such that the left and right side walls 63 are brought into intimate contact with the left and right side surfaces of the mounting portion 33*a*, respectively. Furthermore, the left and right sloped portions 65 and 66 protrude obliquely upward at a predetermined angle (e.g. 45 degrees) over a predetermined length from lower ends of the left and right side walls 63 and 64 associated therewith. Note that the left and right sloped portions 65 and 66 both protrude outward than the surfaces of left and right ends of the fixing portion 62.

Figure 18:
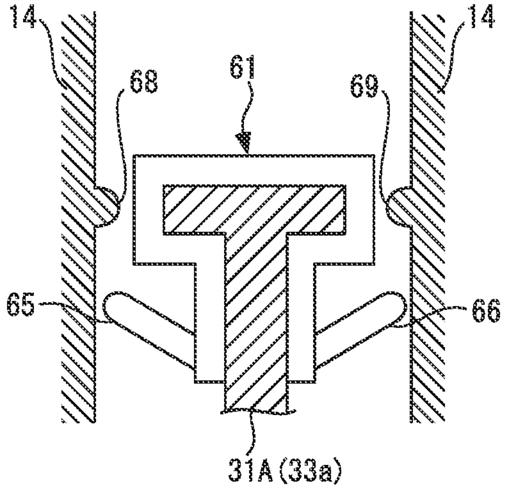
FIG. 18 is a view useful in explaining the relationship between the let-off member of the second embodiment and engagement portions of ribs adjacent to each other.

FIG. 18 shows two ribs 14 and 14 adjacent to each other, and the let-off member 61 disposed between the ribs 14 and 14 and mounted on the mounting portion 33*a* of the first arm 31A. On respective surfaces, which are opposed to each other, of the above-mentioned ribs 14 and 14, that is, on surfaces of the ribs 14 and 14 toward the first arm 31A, engagement portions 68 and 69 which protrude a predetermined length, extend in the front-rear direction (in the depth direction as viewed in FIG. 18), and are opposed to each other, are integrally formed with the respective ribs 14. The engagement portions 68 and 69 are formed at a predetermined height where the let-off member 61 passes when the first arm 31A is pivotally moved in accordance with key depression.

Figure 19A:
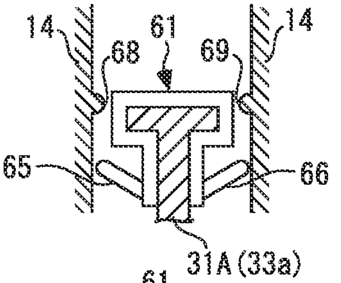
FIGS. 19A to 19F are views useful in explaining movements of the let-off member caused by pivotal movement of the first arm in accordance with key depression.

Now, the operation of the let-off member 61 caused by the pivotal movement of the first arm 31A in accordance with key depression will be described with reference to FIGS. 19A to 19F. Similar to FIG. 18, FIG. 19A shows the let-off member 61 mounted on the mounting portion 33*a* of the first arm 31A in a key-released state.

Figure 19B:
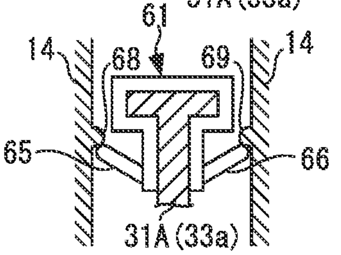
Figure 19C:
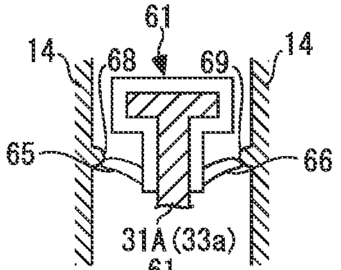
Figure 19D:
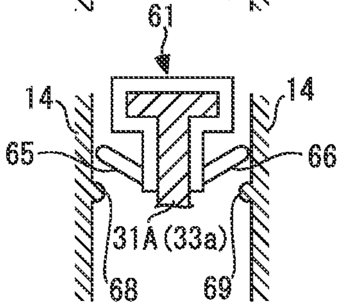

When a key 2 is depressed, the first arm 31A associated with the depressed key 2 is pivotally moved in a predetermined direction, and in accordance therewith, the let-off member 61 of the first arm 31A is moved upward, and tip ends of the left and right sloped portions 65 and 66 are brought into contact with the engagement portions 68 and 69 of the left and right libs 14 and 14 from below (FIG. 19B). Then, when the key 2 is further depressed, the first arm 31A as well is further pivotally moved, whereby the let-off member 61 is pushed up. In this case, the left and right sloped portions 65 and 66 of the let-off member 61 press the engagement portions 68 and 69 of the libs 14 from below, gets over the engagement portions 68 and 69 while being deformed by action of reaction forces from the engagement portions 68 and 69 (FIG. 19C), and reach a position higher than the engagement portions 68 and 69 (FIG. 19D). As described above, in the case where the let-off member 61 of the first arm 31A being pivotally moved passes between the left and right engagement portions 68 and 69 from below to above, the reaction forces from the engagement portions 68 and 69 acts on the let-off member 61, whereby rotational resistance acts on the first arm 31A. With this, similar to the above-described first embodiment, let-off feeling is added to the touch feeling of the key 2 associated with the first arm 31A.

Figure 19E:
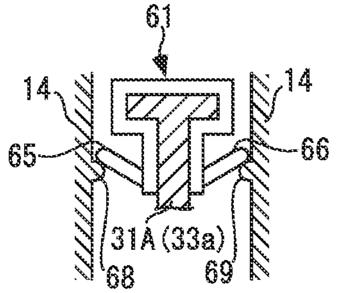
Figure 19F:
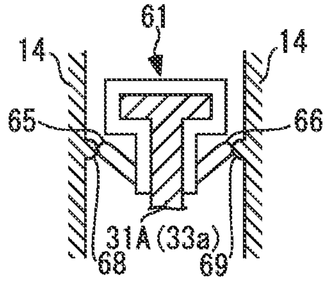

Then, when the depression of the key 2 is released, the key 2 pivotally moves upward, and the first arm 31A pivotally moves in a direction opposite to the above-mentioned direction. In accordance therewith, the let-off member 61 moves downward, and the tip ends of the left and right sloped portions 65 and 66 move into contact with the engagement portions 68 and 69 of the left and right libs 14 and 14 from above (FIG. 19E). Then, when the key 2 further moves upward, the first arm 31A as well further pivotally moves. The left and right sloped portions 65 and 66, while being deformed inward, pass the engagement protrusions 68 and 69, move downward (FIG. 19F), and return to the above-mentioned key-released state (FIG. 19A). As described above, in the case where the sloped portions 65 and 66 of the let-off member 61 of the first arm 31A pass between the engagement protrusions 68 and 69 from above to below, the sloped portions 65 and 66 are easy to bend inward due to the structure thereof, and hence compared with the above-described case where the sloped portions 65 and 66 pass from below to above, the rotational resistance acting on the first arm 31A is very small. Therefore, similar to the above-described first embodiment, when the key 2 having been depressed is released, let-off feeling is not generated.

As described hereinabove, according to the keyboard device 1 including the above-described let-off member 61 of the second embodiment, when the first arm 31 is pivotally moved in accordance with depression of the key 2, the sloped portions 65 and 66 of the let-off member 61 are temporarily engaged with the engagement protrusions 68 and 69 of the left and right libs 14 and 14, whereby rotational resistance acts on the first arm 31A being pivotally moved. With this, the touch weight of the key 2 is temporarily increased, whereby it is possible to add let-off feeling analogous to that of the acoustic piano to the touch feeling of the key 2. Further, similar to the above-described first embodiment, the keyboard device 1 having the let-off function can be made compact, and it possible to enhance the degree of freedom in setting the start timing and duration of let-off.

Note that the present invention is not limited to the above-described embodiment, but it can be practiced in various forms. For example, although in the above-described embodiments, the description is given of a case where the present invention is applied to the keyboard device 1 in which a depressed key 2 operates such that it is pivotally moved about a virtual pivot P or Q located rearward of the rear end of the key 2, the present invention is not limited to this, but as a matter of course, the present invention can be applied to a general keyboard device in which a key is pivotally moved about its own rear end, and which is not provided with the second arm 32.

Further, although the let-off members 51 of the first embodiment are mounted on each adjacent two of the ribs 14 and 14, it is possible to mount the let-off members 51 on only one of each adjacent two of the ribs 14 and 14. Further, although in the first embodiment, the engagement portions 39 and 39 of the first arm 31 are provided at the respective upper portions of the sides of the first arm 31, it is possible to provide them at other locations (e.g. central locations or lower locations) of the sides. Further, it is possible to mount a let-off member configured similar to the let-off member 51 of the first embodiment on a suitable portion (e.g. a portion below the mounting portion 33*a*) of the first arm 31A, in place of the let-off member 61 of the second embodiment.

Further, details of the constructions of the keyboard device 1, the let-off members 51 and 61, the engagement portions 39 of the first arm 31, and the engagement protrusions 68 and 69 of the libs 14 shown in the embodiment are given only by way of example, and they can be modified as appropriate within the scope of the subject matter of the present invention.

What is claimed is:

1. A keyboard device for a keyboard instrument, having a let-off function of imparting a let-off feeling analogous to a let-off of an acoustic piano, comprising:

a keyboard chassis having a plurality of partition walls each extending in a front-rear direction and arranged side by side in a left-right direction with a predetermined spacing therebetween;

a plurality of keys each extending in the front-rear direction and arranged at an upper location in the keyboard chassis at respective associated locations between each adjacent ones of the partition walls; and a plurality of hammers each extending in the front-rear direction, and pivotally supported via a predetermined bearing part on a hammer support shaft that is provided in the keyboard chassis and extends in the left-right direction, such that the hammer extends between the adjacent partition walls, for each being pivotally moved during key depression in a manner interlocked with the associated key, wherein a let-off member is mounted on one of of each of the adjacent two of the partition walls; and the hammer disposed between the two partition walls, and wherein an engagement portion is provided on the other of: each of the adjacent two partition walls; and the hammer disposed between the two adjacent partition walls, for being temporarily engaged in a state of being in contact with the let-off member during pivotal movement of the hammer caused by key depression, whereby a rotational resistance acts on the hammer, to thereby add the let-off feeling to a touch feeling of the depressed key.

2. The keyboard device according to claim 1, wherein the let-off member is made of an elastic material and is mounted on each of the adjacent two partition walls, and wherein the engagement portion is provided on each of left and right sides of the hammer and is configured to be capable of being engaged with each let-off member mounted on the adjacent two partition walls, during the pivotal movement of the hammer caused by key depression.

3. The keyboard device according to claim 2, wherein the let-off member includes:

a mounting portion mounted on one of the two adjacent partition walls, at a predetermined location from below, and an engagement protrusion provided below the mounting portion and having a bent surface bent convex toward the hammer with which the engagement protrusion is to be engaged.

4. The keyboard device according to claim 3, wherein the mounting portion of the let-off member is formed in a recessed shape open upward, which is capable of sandwiching the one of the two adjacent partition walls from both of left and right sides, and wherein the one of the two adjacent partition walls includes a coming-off prevention portion that extends through the mounting portion from above for holding the mounting portion in a state prevented from coming off.

5. The keyboard device according to claim 4, wherein the keyboard chassis is provided with engagement lugs for each being engaged from below with the mounting portion of the let-off member mounted on the one of the two adjacent partition walls.

6. The keyboard device according to claim 3, wherein the engagement protrusion is formed by two engagement protrusions which are arranged with a spacing therebetween in the left-right direction and can be engaged with the two hammers disposed on the left and right sides of the one of the two adjacent partition walls on which the let-off member is mounted.

7. The keyboard device according to claim 6, wherein the two engagement protrusions are disposed in a state displaced from each other in the front-rear direction.

8. The keyboard device according to claim 3, wherein the let-off member is configured such that when the engagement portion of the hammer is engaged with the engagement protrusion from above, resistance force acting on the hammer becomes smaller than resistance force acting on the hammer when the engagement portion is engaged with the engagement protrusion from below.

9. The keyboard device according to claim 3, wherein a plurality of let-off members are prepared as a unit component in which the plurality of let-off members are disposed in a state arranged side by side in a manner associated with the plurality of partition walls on which the let-off members are to be mounted, respectively, and are integrally formed with each other in a state continuous with a connection portion having a belt shape via each mounting portion, and wherein the unit component is configured such that when assembling the keyboard device, the connection portion is separated, after the plurality of let-off members have been mounted on the plurality of partition walls, respectively, from the let-off members.

10. The keyboard device according to claim 9, wherein each of the plurality of let-off members is provided with a symbol corresponding to a partition wall on which the let-off member is to be mounted.

11. The keyboard device according to claim 1, wherein the let-off member is made of an elastic material, mounted on the hammer, and formed in a manner protruding outward from left and right side surfaces of the hammer, and wherein the engagement portion is formed on each of opposed surfaces of adjacent two of the partition walls.

12. The keyboard device according to claim 11, wherein the engagement portion comprises two engagement portions which are formed in a manner protruding from predetermined locations of the respective opposed surfaces of the adjacent two partition walls, and wherein the let-off member comprises;

a fixing portion fixed to an upper portion of the hammer, two left and right side walls continuous with the fixing portion and vertically extending along the left and right side surfaces of the hammer, respectively, and two left and right sloped portions protruding obliquely upward from the two left and right side walls over a predetermined length, respectively.

* * * * *